United States Patent [19]
Partyka et al.

[11] Patent Number: 5,870,691
[45] Date of Patent: Feb. 9, 1999

[54] SPECTRAL DECOMPOSITION FOR SEISMIC INTERPRETATION

[75] Inventors: Gregory A. Partyka; James M. Gridley, both of Tulsa, Okla.

[73] Assignee: Amoco Corporation, Chicago, Ill.

[21] Appl. No.: 759,655

[22] Filed: Dec. 6, 1996

[51] Int. Cl.$^6$ ................................................ G06F 19/00
[52] U.S. Cl. .......................................................... 702/16
[58] Field of Search ................................. 364/421, 422; 367/68, 71, 72, 73

[56] References Cited

U.S. PATENT DOCUMENTS

| | | | |
|---|---|---|---|
| 4,742,497 | 5/1988 | Beasley et al. | 367/52 |
| 4,797,861 | 1/1989 | Beasley | 367/50 |
| 5,274,605 | 12/1993 | Hill | 367/53 |
| 5,500,832 | 3/1996 | Berryhill | 367/51 |

OTHER PUBLICATIONS

"Use of integrated energy spectra for thin–layer recognition", Geophysics, vol. 50, No. 3 (Mar. 1985), pp. 495–500.
"How Thin is a Thin Bed?", Geophysics vol. 38, pp. 1176–1180, Dec. 1973.
"Stratigraphic Modeling and Interpretation—Geophysical principles and Techniques," in Seismic Stratigraphy Applications to Hydrocarbon Exploration, A.A.P.G. Memoir 26, 1977, pp. 389–416.
Seismic Data Processing, Society of Exploration Geophysicists, 1987, Chaptesr 2.2, and 2.2.1, pp. 85–94.

*Primary Examiner*—Donald E. McElheny, Jr.
*Attorney, Agent, or Firm*—James A. Gabala; Robert E. Sloat

[57] ABSTRACT

The present invention is directed generally toward a method of processing seismic data so as to provide improved quantification and visualization of subtle seismic thin bed tuning effects and other sorts of lateral rock discontinuities. A reflection from a thin bed has a characteristic expression in the frequency domain that is indicative of the thickness of the bed: the reflection has a periodic sequence of notches in its amplitude spectrum, said notches being spaced a distance apart that is inversely proportional to the temporal thickness of the thin bed. Further, this characteristic expression may be used to track thin bed reflections through a 3-D volume and estimate their thicknesses and lateral extent. The usefulness of this invention is enhanced by a novel method of frequency domain whitening that emphasizes the geologic information present within the spectrum. Although the present invention is preferentially applied to a 3-D seismic volume, it is alternatively applied to any collection of spatially related seismic traces.

18 Claims, 11 Drawing Sheets

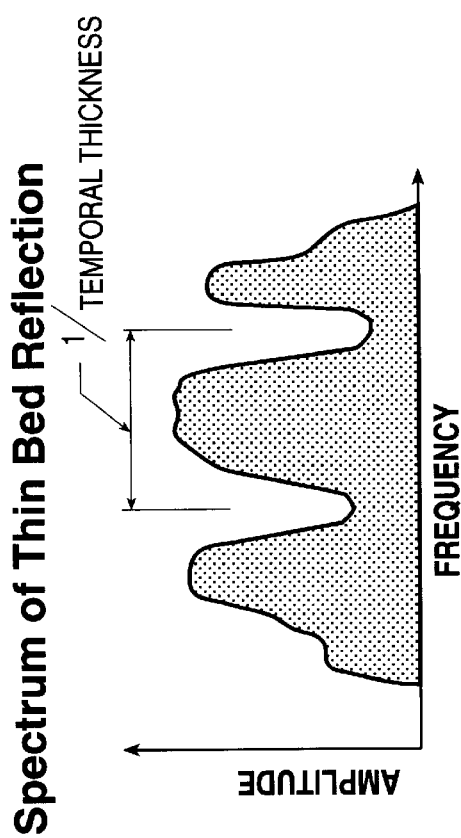
Fig. 3A Spectrum of Source Wavelet
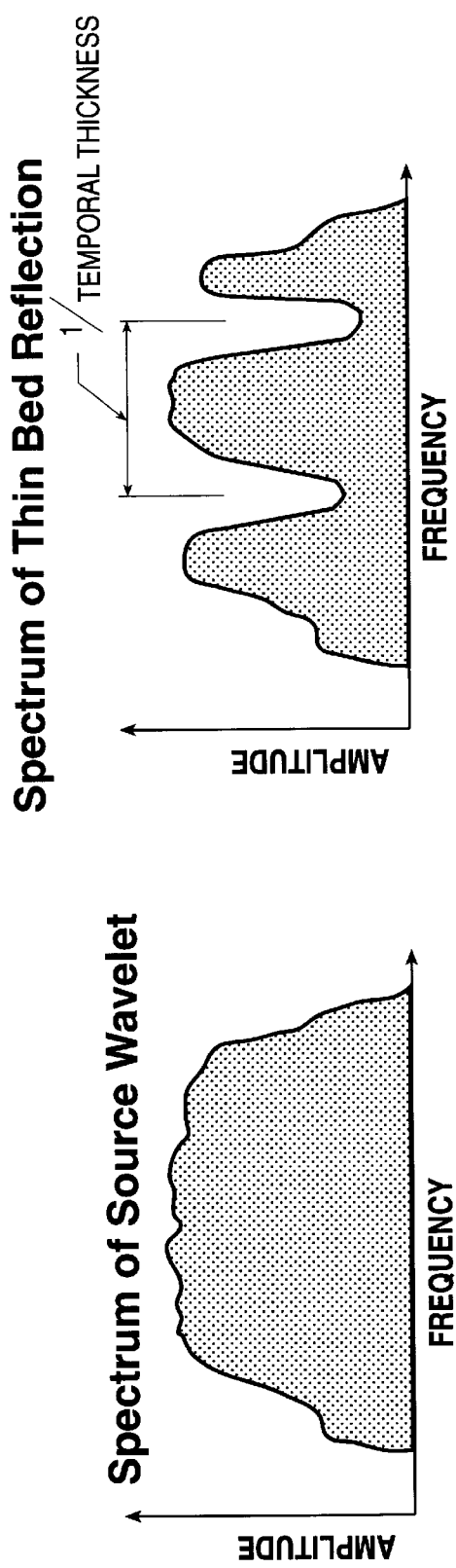
Fig. 3B Spectrum of Thin Bed Reflection
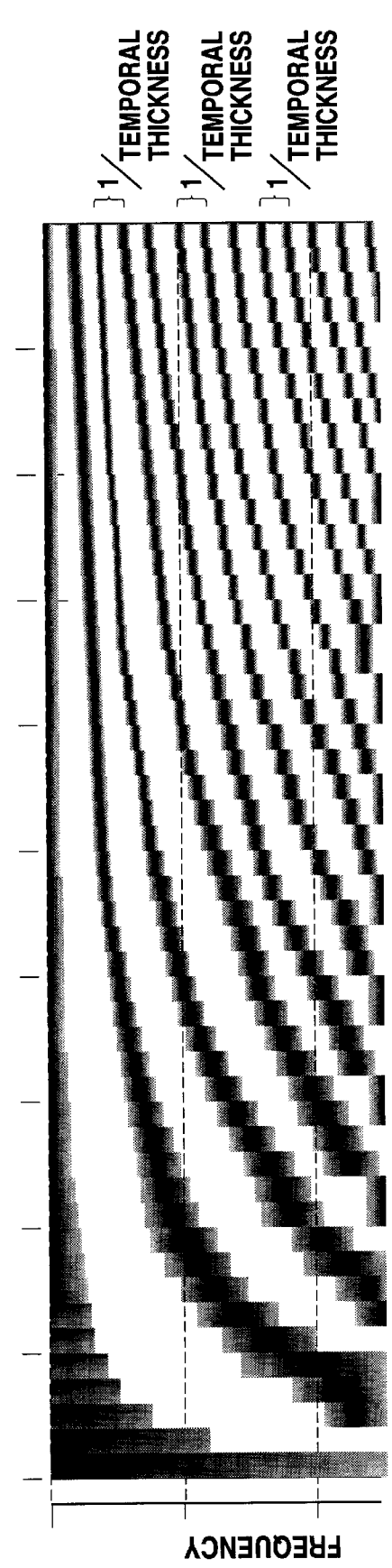
Fig. 4C

SPECTRAL DECOMPOSITION FOR SEISMIC INTERPRETATION

FIELD OF THE INVENTION

The present invention is directed generally toward a method of quantifying and visualizing subtle seismic thin bed tuning effects. This method disclosed herein is implemented by decomposing the seismic reflection signal into its frequency components through the use of a discrete Fourier (or other orthonormal) transform of length dependent upon the thickness of the bed which is to be resolved. After decomposition by said discrete transform, the coefficients obtained thereby are organized and displayed in a fashion which reveals and enhances the characteristic frequency domain expression of thin bed reflection events, making variations in subsurface layer thickness visible that otherwise might not have been observed. The present invention allows the seismic interpreter to analyze and map subsurface geologic and stratigraphic features as a function of spatial position, travel time, and frequency to an extent that has heretofore not been possible.

BACKGROUND

By most standards exploration geophysics is a relatively young science, with some of the earliest work in the subject area dating back to the 1920's and the renowned CMP approach dating from only the 1950's. In the years since its genesis, however, it has become the oil industry's preeminent approach to finding subsurface petroleum deposits. Although exploration geophysics generally encompasses the three broad subject areas of gravity, magnetics, and seismic, today it is the seismic method that dominates almost to the point of excluding the other disciplines. In fact, a simple count of the number of seismic crews in the field has become one accepted measure of the health of the entire oil industry.

A seismic survey represents an attempt to map the subsurface of the earth by sending sound energy down into the ground and recording the "echoes" that return from the rock layers below. The source of the down-going sound energy might come from explosions or seismic vibrators on land, and air guns in marine environments. During a seismic survey, the energy source is moved across the land above the geologic structure of interest. Each time the source is detonated, it is recorded at a great many locations on the surface of the earth. Multiple explosion/recording combinations are then combined to create a near continuous profile of the subsurface that can extend for many miles. In a two-dimensional (2-D) seismic survey, the recording locations are generally laid out along a straight line, whereas in a three-dimensional (3-D) survey the recording locations are distributed across the surface in a grid pattern. In simplest terms, a 2-D seismic line can be thought of as giving a cross sectional picture of the earth layers as they exist directly beneath the recording locations. A 3-D survey produces a data "cube" or volume that is, at least conceptually, a 3-D picture of the subsurface that lies beneath the survey area. Note that it is possible to extract individual 2-D line surveys from within a 3-D data volume.

A seismic survey is composed of a very large number of individual seismic recordings or traces. In a typical 2-D survey, there will usually be several tens of thousands of traces, whereas in a 3-D survey the number of individual traces may run into the multiple millions of traces. A seismic trace is a digital recording of the sound energy reflecting back from inhomogeneities in the subsurface, a partial reflection occurring each time there is a change in the acoustic impedance of the subsurface materials. The digital samples are usually acquired at 0.004 second (4 millisecond) intervals, although 2 millisecond and 1 millisecond intervals are also common. Thus, each sample in a seismic trace is associated with a travel time, a two-way travel time in the case of reflected energy. Further, the surface position of every trace in a seismic survey is carefully recorded and is generally made a part of the trace itself (as part of the trace header information). This allows the seismic information contained within the traces to be later correlated with specific subsurface locations, thereby providing a means for posting and contouring seismic data, and attributes extracted therefrom, on a map (i.e., "mapping"). The signal that is sent down into the earth is called a seismic waveform or seismic wavelet. Different seismic waveforms are generated depending on whether the source is an air gun, dynamite or vibrator. The term "source signature" or "source pulse" is generally used to describe the recorded seismic character of a particular seismic waveform.

A seismic source generated at the surface of the earth immediately begins to travel outward and downward from its point of origin, thereafter encountering and passing through rock units in the subsurface. At each interface between two different rock units, there is the potential for a seismic reflection to occur. The amount of seismic energy that is reflected at an interface is dependent upon the acoustic impedance contrast between the units and the reflection coefficient is one conventional measure of that contrast. The reflection coefficient can be thought of as the ratio of the amplitude of the reflected wave compared with the amplitude of the incident wave. In terms of rock properties:

$$\text{reflection coefficient} = \frac{\text{acoustic impedance below} - \text{acoustic impedance above}}{\text{acoustic impedance below} + \text{acoustic impedance above}}$$

$$= \frac{\rho_2 V_2 - \rho_1 V_1}{\rho_2 V_2 + \rho_1 V_1}$$

where, the acoustic impedance of a rock unit is defined to be the mathematical product of the rock density ($\rho_1$ and $\rho_2$ being the densities of the upper lower rock units, respectively) multiplied times the velocity in the same rock unit, $V_1$ and $V_2$ corresponding to the upper and lower rock unit velocities. (Strictly speaking, this equation is exactly correct only when the wavelet strikes the rock interface at vertical incidence. However, it is generally accepted in the industry that the requirement of verticality is satisfied if the wavelet strikes the interface within about 20° of the vertical.)

Reflected energy that is recorded at the surface can be represented conceptually as the convolution of the seismic wavelet with a subsurface reflectivity function: the so-called "convolutional model". In brief, the convolutional model attempts to explain the seismic signal recorded at the surface as the mathematical convolution of the down going source wavelet with a reflectivity function that represents the reflection coefficients at the interfaces between different rock layers in the subsurface. In terms of equations, $$x(t) = w(t) * e(t) + n(t),$$

where $x(t)$ is the recorded seismogram, $w(t)$ is the seismic source wavelet, $e(t)$ is the earth's reflectivity function, $n(t)$ is random ambient noise, and "*" represents mathematical convolution. Additionally, the convolutional model requires, in part, that (1) the source wavelet remains invariant as it travels through the subsurface (i.e., that it is stationary and unchanging), and (2) the seismic trace recorded at the surface can be represented as the arithmetic sum of the separate convolutions of the source wavelet with each interface in the subsurface (the principle of "superposition", i.e., that wavelet reflectivity and propagation is a linear system.) Although few truly believe that the convolutional model fully describes the mechanics of wave propagation, the model is sufficiently accurate for most purposes: accurate enough to make the model very useful in practice. The convolutional model is discussed in some detail in Chapter 2.2 of *Seismic Data Processing* by Ozdogan Yilmaz, Society of Exploration Geophysicists, 1987, the disclosure of which is incorporated herein by reference.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets. In brief, seismic data provides some of the best subsurface structural and stratigraphic information that is available, short of drilling a well.

Seismic data are limited, through, in one crucial regard: rock units that are relatively "thin" are often not clearly resolved. In more particular, whereas seismic reflection data can provide a near "geologic cross section" representation of the subsurface when the lithologic layers are relatively "thick", the seismic image that results when the layers are "thin" is much less clear. This phenomenon is known to those skilled in the art as the seismic resolution problem.

Seismic resolution in the present context will be taken to refer to vertical resolution within a single seismic trace, and is loosely defined to be to the minimum separation between two seismic reflectors in the subsurface that can be recognized as separate interfaces—rather than as a single composite reflection—on the seismic record. By way of explanation, a subsurface unit is ideally recognized on a seismic section as a combination of two things: a distinct reflection originating at the top of the unit and a second distinct reflection, possibly of opposite polarity, originating from its base. In the ideal case, both the top and the bottom of the unit appear on the recorded seismogram as distinct and isolated reflectors that can be individually "time picked" (i.e., marked and identified) on the seismic section, the seismic data within the interval between the two time picks containing information about the intervening rock unit. On the other hand, where the seismic unit is not sufficiently thick, the returning reflections from the top and the bottom of the unit overlap, thereby causing interference between the two reflection events and blurring the image of the subsurface. This blurred image of the subsurface is one example of the phenomena known to those skilled in the art as the "thin bed" problem.

FIGS. 1*a* and 1*b* illustrates in a very general way how the thin bed problem arises under the axioms of the convolutional model. Consider first the "thick" bed reflection depicted in FIG. 1*a*. On the left side of this figure is represented a source wavelet which has been generated on the surface of the earth. The source wavelet travels downward unchanged through the earth along path P1 until it encounters the rock unit interface labeled "A." (Note that the wave paths in this figure are actually vertical, but have been illustrated as angled for purposes of clarity. This is in keeping with the general practice in the industry.) In FIG. 1*a*, when the down-going seismic waveform encounters Interface "A" a portion of its energy is reflected back toward the surface along path P2 and is recorded on the surface as the reflected event R1. Note that wavelet R1 is reversed in polarity as compared with the source wavelet, thereby indicating a negative reflection coefficient at the "A" interface. This polarity reversal is offered by way of example only and those skilled in the art recognize that reflection coefficients of either polarity are possible.

The remainder of the down-going energy (after the partial reflection at the interface "A") continues through the thick bed until it strikes Interface "B" at the base of the thick lithographic unit. Upon reaching the "B" interface, part of the wavelet energy continues deeper into the earth along path P5, while the remainder of its energy is reflected back to the surface along path P4 where it is recorded as reflection R2. Note that the reflection from interface "B" occurs at a later point in time than the reflection from interface "A". The exact time separation between the two events depends on the thickness and velocity of the intervening layer between the two interfaces, with thick layers and/or slow velocities creating a greater time separation between the top and base reflections. The temporal thickness of this layer is the time that is required for the seismic waveform to traverse it.

On the surface, the composite thick bed reflection—the expression actually recorded—is the arithmetic sum (superposition) of the two returning reflections, taking into account the time separation between the events. Because the two returning wavelets do not overlap in time, the recorded seismic record clearly displays both events as indicative of two discrete horizons. (Note that the time separation between the two reflected events has not been accurately portrayed in this figure. Those skilled in the art know that the time separation should actually be twice the temporal thickness of the layer.)

Turning now to FIG. 1*b*, wherein a thin bed reflection is illustrated, once again a source wavelet is generated on the surface of the earth which then travels along path P6 until it encounters the rock unit interface labeled "C." (As before, the wave paths in the figure are actually vertical.) As is illustrated in FIG. 1*b*, when the down-going seismic waveform encounters Interface "C" a portion of its energy is reflected back toward the surface along path P7, where it is recorded as reflection R3. The remainder of the down-going energy continues through the thin bed until it strikes Interface "D". Upon reaching the "D" interface, part of the wavelet energy continues deeper into the earth along path P10, while the remainder of its energy is reflected back to the surface along path P9 where it is recorded as reflection R4.

Note once again, that the reflection from interface "D" occurs at a later time than the reflection from interface "C", however the temporal separation between the two reflections in the case of a thin bed is less because the distance the waveform must travel before being reflected from interface "D" is less. In fact, the time separation between the two reflections is so small that the returning (upward going)

wavelets overlap. Since the composite thin bed reflection is once again the arithmetic sum of the two returning reflections, the actual recorded signal is an event that is not clearly representative of either the reflection from the top or the base of the unit and its interpretation is correspondingly difficult. This indefinite composite reflected event exemplifies the typical thin bed problem.

Needless to say, the thickness of a subsurface exploration target is of considerable economic importance to the oil company explorationist because, other things being equal, the thicker the lithographic unit the greater the volume of hydrocarbons it might potentially contain. Given the importance of accurately determining layer thickness, it should come as no surprise that a variety of approaches have been employed in an effort to ameliorate the thin bed problem.

A first technique that is almost universally applied is shortening the length of the seismic wavelet, longer wavelets generally offering worse resolution than shorter ones. During the data processing phase the recorded seismic waveform may often be shortened dramatically by the application of well known signal processing techniques. By way of example, it is well known to those skilled in the art that conventional predictive deconvolution can be used to whiten the spectrum of the wavelet, thereby decreasing its effective length. Similarly, general wavelet processing techniques, including source signature deconvolution and any number of other approaches, might alternatively be applied to attempt to reach a similar end result: a more compact waveform. Although any of these processes could result in dramatic changes to the character of the seismic section and may shorten the length of the wavelet significantly, it is often the case that further steps must be taken.

Even the best signal processing efforts ultimately only postpone the inevitable: no matter how compact the wavelet is, there will be rock layers of economic interest that are too thin for that wavelet to resolve properly. Thus, other broad approaches have been utilized that are aimed more toward analysis of the character of the composite reflection. These approaches are based generally on the observation that, even when there is only a single composite reflection and the thickness of the layer cannot be directly observed, there is still information to be found within the recorded seismic data that may indirectly be used to estimate the actual thickness of the lithographic unit.

By way of example, FIG. 4a illustrates a familiar "pinch out" seismic model, wherein the stratigraphic unit of interest (here with its thickness measured in travel time rather than in length) gradually decreases in thickness until it disappears (i.e., "pinches out") at the left most end of the display. FIG. 4b is a collection of mathematically generated synthetic seismograms computed from this model that illustrate the noise free convolution of a seismic wavelet with the interfaces that bound this layer. Notice that at the right most edge of FIG. 4b, the composite signal recorded on the first trace shows that the reflector is clearly delimited by a negative reflection at the top of the unit and a positive reflection at its base. Moving now to the left within FIG. 4b, the individual reflections at the top and base begin to merge into a single composite reflection and eventually disappear as the thickness of the interval goes to zero. Note, however, that the composite reflection still continues to change in character even after the event has degenerated into a single reflection. Thus, even though there is little direct visual evidence that the reflection arises from two interfaces, the changes the reflections exhibit as the thickness decreases suggest that there is information contained in these reflection that might, in the proper circumstances, provide some information related to the thickness of the thin bed.

The pioneering work of Widess in 1973 (Widess, *How thin is a thin bed?*, Geophysics, Vol. 38, p. 1176–1180) has given birth to one popular approach to thin bed analysis wherein calibration curves are developed that rely on the peak-to-trough amplitude of the composite reflected thin bed event, together with the peak-to-trough time separation, to provide an estimate of the approximate thickness of the "thin" layer. (See also, Neidell and Poggiagliomi, *Stratigraphic Modeling and Interpretation—Geophysical principles and Techniques*, in SEISMIC STRATIGRAPHY APPLICATIONS TO HYDROCARBON EXPLORATION, A.A.P.G. Memoir 26, 1977). A necessary step in the calibration process is to establish a "tuning" amplitude for the thin bed event in question, said tuning amplitude occurring at the layer thickness at which maximum constructive interference occurs between the reflections from the top and base of the unit. In theory at least, the tuning thickness depends only on the dominant wavelength of the wavelet, $\lambda$, and is equal to $\lambda/2$ where the reflection coefficients on the top and bottom of the unit are the same sign, and $\lambda/4$ where the reflection coefficients are opposite in sign.

Because of the flexibility of calibration-type approaches, they have been used with some success in rather diverse exploration settings. However, these amplitude and time based calibration methods are heavily dependent on careful seismic processing to establish the correct wavelet phase and to control the relative trace-to-trace seismic trace amplitudes. Those skilled in the seismic processing arts know, however, how difficult it can be to produce a seismic section that truly maintains relative amplitudes throughout. Further, the calibration based method disclosed above is not well suited for examining thin bed responses over a large 3-D survey: the method works best when it can be applied to an isolated reflector on a single seismic line. It is a difficult enough task to develop the calibration curve for a single line: it is much more difficult to find a calibration curve that will work reliably throughout an entire 3-D grid of seismic data.

Heretofore, as is well known in the seismic processing and seismic interpretation arts, there has been a need for a method extracting useful thin bed information from conventionally acquired seismic data which does suffer from the above problems. Further, the method should also preferably provide attributes for subsequent seismic stratigraphic and structural analysis. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims. Finally, although the invention disclosed herein may be illustrated by reference to various aspects of the convolutional model, the methods taught below do not rely on any particular model of the recorded seismic trace and work equally well under broad deviations from the standard convolutional model.

SUMMARY OF THE INVENTION

The present inventors have discovered a novel means of utilizing the discrete Fourier transform to image and map the extent of thin beds and other lateral rock discontinuities in conventional 2-D and 3-D seismic data. In more particular, the invention disclosed herein is motivated by the observation that the reflection from a thin bed has a characteristic expression in the frequency domain that is indicative of the thickness of the bed: a homogeneous thin bed introduces a periodic sequence of notches into the amplitude spectrum of the composite reflection, said notches being spaced a distance apart that is inversely proportional to the temporal thickness of the thin bed. Further, if the Fourier transform coefficients are properly displayed this characteristic expression may be exploited by the interpreter to track thin bed reflections through a 3-D volume and estimate their thicknesses and extent to a degree not heretofore possible. More generally, the method disclosed herein may be applied to detect and identify vertical and lateral discontinuities in the local rock mass. Also, the usefulness of the present invention is enhanced by a novel method of frequency domain whitening that emphasizes the geologic information present within the spectrum. Finally, the instant invention is also directed toward uncovering seismic attributes that can be correlated with subsurface structural and stratigraphic features of interest, thereby providing quantitative values that can be mapped by the explorationist and used to predict subsurface hydrocarbon or other mineral accumulations.

By way of general background, the present invention preferably utilizes a relatively short discrete Fourier transform to determine the frequency components of a seismic trace. As is known to those skilled in the art, calculation of a Fourier transform of a time series, even one that is exclusively real valued, results in a collection of Fourier transform coefficients that are complex data values of the form "A+Bi", where "i" represents the "imaginary" number or the square root of a negative one. Further, it is well known that the expression A+Bi may equivalently written as:

$$A + Bi = re^{i\theta},$$

where, $$r = |A + Bi| = \sqrt{A^2 + B^2},$$

and $$\theta = \tan^{-1}\left(\frac{B}{A}\right).$$

The quantity θ is known as the phase angle (or just the "phase") of the complex quantity A+Bi, the quantity "r" its magnitude, and the expression |A+Bi| is the mathematical notation for the magnitude of a complex valued quantity, also called its absolute value. A frequency spectrum is obtained from the Fourier transform coefficients by calculating the complex magnitude of each transform coefficient. Further, the numerical size of each coefficient in the frequency spectrum is proportional to the strength of that frequency in the original data. Finally, after application of a Fourier transform to some particular time series, the resulting series of complex coefficients are said to be in the frequency domain, whereas the untransformed data are referred to as being in the time domain.

Returning now to a discussion of the instant invention, the invention disclosed herein relies on the general observation that a frequency spectrum calculated from a whole trace Fourier transform tends to resemble the spectrum of the source wavelet, whereas shorter window spectra tend to reflect more of the underlying geological information. This is because long analysis windows encompass a great deal of geological variation, said variations tending over the long term to exhibit a "white" (or random and uncorrelated) reflectivity function, which has a "flat" amplitude spectrum. Thus, the shape of a frequency spectrum calculated from an entire seismic trace is largely dependent on the frequency content of the source wavelet. (See, for example, Chapter 2.2.1 of *Seismic Data Processing* by Ozdogan Yilmaz, Society of Exploration Geophysicists, 1987, the disclosure of which is incorporated herein by reference.) On the other hand, where the analysis window is so short that the earth reflectivity function is non-white, the resulting Fourier spectrum contains influences from both the wavelet and local geology. Over such small windows, geology acts as a filter, attenuating the spectrum of the source wavelet and thereby creating non-stationary short-window spectra.

The foregoing ideas are illustrated generally in FIG. 2, wherein a typical seismic trace and some frequency spectra calculated therefrom have been plotted. At the top of that figure is the Fourier transform frequency spectrum of the entire seismic trace. The appearance of that spectrum is generally that of a typical field wavelet. However, the spectra calculated over shorter windows, pictured at the bottom of FIG. 2, are nonstationary, tending to reflect the underlying geology which may potentially change dramatically over fairly short intervals.

The importance of this observation for the present invention is illustrated in FIG. 3, wherein two representative spectra are generically pictured. The left frequency spectrum (FIG. 3A) represents that of a typical broad bandwidth source wavelet. The right spectrum (FIG. 3B), however, represents in a general way the frequency domain expression of a composite reflection from a thin bed. In this later case, the geology of the thin bed has tended to act as a frequency domain filter and has produced its own mark on the frequency content of the reflected wavelet. As is generally illustrated in FIG. 3B, the present inventors have discovered that a homogeneous thin bed affects the amplitude spectrum of the reflection event by introducing "notches", or narrow bands of attenuated frequencies, into it, thereby producing a characteristic appearance. A homogeneous bed is one that has a constant velocity and density throughout its extent. Further, the distance between the notches so introduced is equal to the inverse of the "temporal thickness" of the thin bed layer, temporal thickness being the length of time that it takes for a wavelet to traverse the layer in one direction (the thickness of the layer divided by the its velocity). Thus, attenuated frequencies in the amplitude spectrum may be used to identify a thin bed reflection and to gauge its thickness.

Turning now to FIGS. 4a–4c, the results suggested in the previous paragraph are extended to the analysis of a simplistic 2-D geological model, wherein the frequency domain expression of a thin bed is investigated. In FIG. 4a, a typical "pinch out" reflectivity function (geological model) is presented. FIG. 4c contains a grey-scale display of the Fourier transform frequency spectrum amplitudes calculated from this model. This display was produced by creating a discrete time series at fifty equally spaced positions across the model, each of which has only two non-zero values: one corresponding to the reflection coefficient at the top of the layer, and the other to the reflection coefficient at its base. Each of the non-zero values is placed within the otherwise zero-filled trace in positions that reflect the location in time of the top and bottom of the reflector, respectively. A standard discrete Fourier transform was then calculated for the time series, followed by calculation of the complex magnitude of each coefficient.

In FIG. 4c, the lighter portions correspond to larger values of the amplitude spectra, whereas the darker portions represent small values. Thus, "notches" in the amplitude spectra are represented by the darker values in the plot. This figure displays, in a most literal sense, the Fourier transform of the geology and, more particularly, the characteristic signature that is impressed on the wavelet by this event. What is most significant about this plot relative to the instant invention is that, as the thickness of the model decreases, the spacing between the notches increases. Further, for a given model thickness the notches are periodic, with a period equal to the reciprocal of the temporal thickness of the layer. Thus, if this signature—periodic frequency domain notches—can be located within a seismic survey, it is strong evidence that a thin bed is present.

According to one aspect of the present invention there has been provided a system for interpreting seismic data containing thin bed events, wherein the data are decomposed into a series of Fourier transform 2-D lines or 3-D volumes, thereby providing enhanced imaging of the extent of said thin bed layers. The instant embodiment utilizes a single Fourier transform window which is separately applied to the portion of each seismic trace that intersects a zone of interest. This embodiment is illustrated generally in FIG. 5 as applied to 3-D seismic data, but those skilled in the art will realize that the same method could also be practiced to advantage on a 2-D collection of seismic traces to enhance the visibility of thin bed reflections contained therein.

As a first, step a collection of spatially related seismic traces are assembled. These traces might be, for purposes of illustration only, one or more shot records, a constant offset gather, a CMP gather, a VSP survey, a two-dimensional seismic line, a two-dimensional stacked seismic line extracted from a 3-D seismic survey or, preferably, a 3-D portion of a 3-D seismic survey. Furthermore, the present invention might also be applied to a 2-D or 3-D survey wherein the data have been transposed, i.e., where an "offset" or spatial axis ("X" or "Y" axis for 3-D data) has been oriented so as to replace the vertical or "time" axis. More generally, any 3-D volume of digital data may be processed by the methods disclosed herein. That being said, for purposes of clarity the vertical axis will be referred to as the "time" axis hereinafter, although those skilled in the art understand that the digital samples might not be separated by units of time. Whatever the choice, the invention disclosed herein is most effective when applied to a group of seismic traces that have an underlying spatial relationship with respect to some subsurface geological feature. Again for purposes of illustration only, the discussion that follows will be couched in terms of traces contained within a stacked 3-D survey, although any assembled group of spatially related seismic traces could conceivably be used.

As is illustrated generally in FIG. 5, a zone of interest is next selected within a particular 3-D volume. The zone of interest might be, by way of example, the undulating region bounded by two picked reflectors as is pictured in FIG. 5. In that case, the reflector is preferentially flattened or datumized (i.e., made flat by shifting individual traces up or down in time) before analysis, and possibly also palinspastically reconstructed. More conventionally, a specific bounded time interval (for example, from 2200 ms to 2400 ms) might be specified, thereby defining a "cube" or, more accurately, a "box" of seismic data within the 3-D volume: a sub-volume. Additionally, the lateral extent of the zone of interest may be limited by specifying bounding "in-line" and "cross-line" trace limits. Other methods of specifying the zone of interest are certainly possible and have been contemplated by the inventors.

The selection and extraction of the data corresponding to the zone of interest is known as "subsetting" the data (FIG. 5). One criterion that guides the selection of the zone of interest is the desire to keep the zone as short (in time) as possible. This is in keeping with the general philosophy espoused above regarding the tendency of long-window Fourier transform spectra to resemble the wavelet and short-window Fourier transform spectra to contain more geologically related information. Note that there is a "hidden" window enlargement that is often applied automatically and unthinkingly to Fourier transform windows: extension of the window size to a length that is a power of two. This lengthening of the window is done for purposes of computational efficiency, as window lengths that are powers of two are candidates for the Fast Fourier Transform (FFT) algorithm. However, the present inventors specifically counsel against this industry-wide practice and prefer to use a more general, if less computationally efficient, discrete Fourier transform algorithm, thereby keeping the length of the analysis window to its minimum possible value. Given the computational power of computers today, there is little reason not to transform only the data within the zone of interest.

In FIG. 5, the "COMPUTE" step, as applied to the present embodiment, consists of at least one operation: calculating a discrete Fourier transform over the zone of interest. The resulting coefficients, the spectral decomposition of the zone of interest, are then stored as part of the output spectral decomposition volume ("tuning cube") for subsequent viewing. Note that there will be one trace (i.e., collection of Fourier transform coefficients) in the output tuning cube volume for each seismic trace processed as part of the input. Also note that in this presently preferred output arrangement, horizontal plane slices through the volume contain coefficients corresponding to a single common Fourier frequency.

Optionally, the "COMPUTE" step may contain additional operations which have the potential to enhance the quality of the output volume and subsequent analysis. First, a weight function may be applied to the seismic data within the zone of interest prior to calculating the transform. The purpose of the weight function is to taper or smooth the data within the Fourier analysis window, thereby lessening the frequency-domain distortions that can arise with a "box-car" type analysis window. The use of a weight function prior to transformation is well known to those skilled in the art. The preferred weighing function for the invention disclosed herein is Gaussian in shape and is in many ways optimal for this application. That being said, note that many other weight functions could also potentially be used.

Additionally, since it is usually the amplitude spectrum that is of greatest interest to the explorationist, the amplitude spectrum may be calculated from the transform coefficients as they are moved into an auxiliary storage area. Alternatively, a phase spectrum, or some other derived attribute, can be calculated from the transform coefficients before storage and, indeed, these sorts of calculations have been made by the present inventors.

Finally, as part of the computation step, an individual frequency scaling may be applied to each plane (i.e., frequency) in the output volume. As illustrated generally in FIG. 10, the inventors have found it preferable to separately scale each frequency slice in the output volume to have the same average value before viewing it. This scaling is just one of many that might be applied, but the inventors prefer this method because it tends to enhance the geological content of the stored frequency spectra at the expense of the common wavelet information.

Once the spectra have been calculated and stored, they are ready to be used in the geophysical exploration for thin beds. Note that it is critical that, when the data are subsequently displayed, each spectrum be organized and viewed in the same spatial relationship with the other spectra as the traces from which they were calculated. That is, spatial relationships that are present in the untransformed data must be preserved in the arrangements of the transform coefficients. The presently preferred method of viewing the transform coefficients is to begin by forming them into a 3-D "volume" (tuning cube), provided, of course, that the input data were originally taken from a 3-D volume. Note, however, that the vertical ("z") axis is no longer "time" as it was before the transformation, but rather now represents, by convention, units of frequency, as Fourier transform coefficients are stored therein.

The tuning cube, as illustrated in the last step in FIG. 5, may now be viewed in any manner that could be used to view a conventional 3-D volume of seismic data. That being said, the present inventors have discovered that viewing successive horizontal slices through the volume of coefficients is a preferred way to locate and visualize thin bed effects. Note that in the tuning cube arrangement, a horizontal slice represents all of the coefficients corresponding to a single Fourier frequency and, thus is a constant frequency cross section. Further, as an aid in the analysis of the data contained within this volume, the inventors preferably animate a series of horizontal views through the volume. In the event that the zone of interest is a portion of an individual seismic line rather than a volume, the resulting display, being a collection of spatially related seismic trace Fourier transform spectra displayed in their original spatial relationship, will still be referred to as a tuning cube herein, even though, technically, it may not be a "cube" of data.

Animating successive horizontal slices through the spectral volume is the preferred method of viewing and analyzing the transform coefficients, said animation preferably taking place on the computer monitor of a high speed workstation. As is well known to those skilled in the art, animation in the form of interactive panning through the volume is a fast and efficient way to view large amounts of data. The data volume might be viewed in horizontal, vertical, or oblique slices, each of which provides a unique view of the data. More importantly, however, in the context of the present invention rapidly viewing successive horizontal slices in succession provides a diagnostic means to survey a large volume of data and identify the thin bed reflections therein, the details of which will be discussed below. Note that it is preferable for the method disclosed herein that the slices be ordered in terms of frequency (either strictly increasing or decreasing) when they are animated and viewed.

According to a second aspect of the present invention, there has been provided a system for processing seismic data to enhance the appearance on the seismic record of thin bed events, wherein the data are decomposed into a series of Fourier transform 2-D lines or 3-D volumes by using a series of overlapping short-window Fourier transforms, thereby providing enhanced imaging of thin bed layers. This embodiment is illustrated generally in FIG. 6 as applied to 3-D seismic data, but those skilled in the art will realize that the same method could also be practiced to advantage on a 2-D seismic line to enhance the visibility of thin bed reflections contained therein. As indicated in FIG. 6, and as disclosed previously, the first step in the present embodiment involves the interpreter mapping the temporal bounds of the seismic zone of interest. As was described previously, the mapping may result in a seismic data cube or rectangular piece of an individual seismic line.

In the present embodiment, rather than applying a single-window Fourier transform to each trace, instead a series of overlapping short window Fourier transforms are utilized. The length of the window and the amount of overlap varies with the particular application, but once again the window length need not be equal to a power of "2" but rather should be chosen so as to best image the underlying geology. Note that a weight might optionally be applied to the data within each short window before transformation and, as before, a Gaussian weight is the preferred choice.

As indicated in FIG. 6, as each short-window Fourier transform is calculated, the coefficients resulting therefrom are separately stored within an individual tuning cube that remains associated with the short-window that gave rise to it. Note that in the instant case there will be as many tuning cubes produced as there were overlapping windows in the analysis. Scaling, if it is applied, is applied separately to each frequency plane in each tuning cube.

Each short-window tuning cube produced by a sliding window may now be individually examined in exactly the same fashion as that proposed previously for first embodiment. Once again, each cube is preferably viewed in horizontal slices or constant frequency images, thereby providing a means for visualizing geological changes with frequency. Further, since there is now a collection of tuning cubes calculated at different time points in the trace, in effect a collection of tuning cubes have been produced that span a range of depths in the subsurface.

Finally, according to a third aspect of the present invention there has been provided a system for processing seismic data to enhance the appearance on the seismic record of thin bed events, wherein the data are decomposed into a series of Fourier transform 2-D lines or 3-D volumes by using a short-window Fourier transform and are then reorganized into single frequency tuning cubes, thereby providing enhanced imaging of thin bed layers.

As is generally illustrated in FIG. 7, the first steps in this present embodiment mirror those of the previous two embodiments: the data are first interpreted then subsetted. Thereafter, a series of overlapping short window Fourier transforms are calculated from the seismic data within the zone of interest, optionally preceded by the application of a weight or taper within each window before calculating the transform. As in the previous embodiment, the coefficients from each short window transform are accumulated. In the instant case however, rather than viewing the calculated Fourier transform coefficients as tuning cubes, the data are reorganized into single frequency energy cubes which can thereafter be examined either in a horizontal or vertical plane for evidence of thin bed effects.

In more particular, the reorganization contemplated by the present inventors conceptually involves extracting from all of the tuning cubes every horizontal slice that corresponds to a particular frequency. Then, these individual same-frequency slices are "stacked" together, the topmost slice containing coefficients calculated from the topmost sliding window, the next slice containing coefficients calculated from the first sliding window below the top, etc. Note that, after reorganization, the volume of coefficients is organized into units of "x–y" and time. This is because the vertical axis is ordered by the "time" of the sliding window that gave rise to a particular coefficient.

To utilize the information with the single frequency tuning cubes constructed by the previous step, a seismic interpreter would select a frequency and the seismic volume corresponding thereto (e.g., he or she might select the coefficient volume corresponding to 10 hz, and/or the volume for 11 hz, etc.). Each constant-frequency cube may be viewed in plan or horizontal view, or in any other manner, thereby providing a means for visualizing geological changes with lateral extent for a particular frequency.

It is important to note that, in all of the above described embodiments, the fact that the original untransformed traces were spatially related provides additional utility to the invention disclosed herein. In more particular, it is well known that short-window Fourier transform coefficients are inherently quite noisy and have poorer frequency resolution in comparison with a longer window transform. One approach that the present inventors have used to improve the reliability of the transformed values is to apply a Gaussian weight function to the pre-transformed data values. However, another equally important step taken by the present inventors is to display the coefficients within a volume in the same spatial relationship as that of the input data. Since the traces so displayed contain spatially correlated information, displaying them next to each other allows the observe to visually "smooth out" the noise and perceive the underlying coherent signal information.

Finally, although the present invention is discussed herein in terms of the discrete Fourier transform, in reality the Fourier transform is just one of any number of discrete time data transformations that could used in exactly the same fashion. The general steps of (1) computing a short window transformation (2) associating the resulting transform coefficients into a volume, and (3) examining the volume for evidence of thin bed effects, could be accomplished with a wide variety of discrete data transformations other than the Fourier. If the transformation is other than a Fourier, the tuning volumes would be formed by grouping together coefficients corresponding to the same basis function.

Those skilled in the art will understand that a discrete Fourier transform is just one of many discrete linear unitary transformations that satisfy the following properties: (1) they are linear operators that are (2) exactly invertible, and (3) their basis functions form an orthonormal set. In terms of equations, if $x(k)$, $k=1, L$, represents a time series, and $X(n)$ its "nth" transformed value, $n=1, L$, then the forward transform of the time series may be generally written for this class of transformations as:

$$X(n) = \sum_{k=0}^{L-1} x(k)A(k;n),$$

where $A(k;n)$ represents the forward transform kernel or collection of basis functions. Further, there is an inverse transform which maps the transformed values back into the original data values:

$$x(k) = \sum_{n=0}^{L-1} X(n)B(k;n),$$

where $B(k;n)$ is inverse transform kernel. The requirement of orthonormality implies that the inner products between two different basis functions must be equal to zero, and the magnitude of each basis function must be equal to unity. This requirement may be succinctly summarized by the following equations:

$$\sum_{n=0}^{L-1} A(j;n)A^*(k;n) = \delta(j-k)$$

$$\sum_{k=0}^{L-1} A(k;n)A^*(k;m) = \delta(n-m)$$

where $$\delta(n-m) = \begin{cases} 0, n \neq m \\ 1, n = m \end{cases},$$

and $A^*(k;n)$ represents the complex conjugate of $A(k;n)$. For the discrete Fourier transform, the basis functions corresponding to a forward transform of length L are conventionally chosen to be the set of complex exponentials:

$$A(k;n) = \{e^{-2\pi i k n/L}, k=0, L-1\}.$$

There are thus L basis functions (or basis vectors in this case), one basis function for each value of "n":

$$n = -\frac{L}{2}, \ldots, 0, \ldots \frac{L}{2} - 1.$$

To summarize: each transform coefficient, $X(n)$, calculated from a data window corresponds to a particular basis function, and a tuning volume is formed by collecting all of the transform coefficients corresponding to a particular zone of interest and storing those coefficients in an auxiliary storage area in the same spatial arrangement as the traces from which each window was computed.

By way of another specific example, those skilled in the art understand that a discrete Walsh transform could be used in place of the Fourier transform and the Walsh coefficients similarly grouped, displayed, and analyzed. In the manner disclosed above, a Walsh transform may be computed within an overlapping series of sliding windows and the coefficients resulting therefrom organized and stored into tuning cubes. Rather than the calculated transform coefficients representing frequency, of course, these coefficients instead represent a similar quantity called "sequency" by those skilled in the art. Thus, "single sequency" tuning cubes may be formed from the Walsh transform coefficients in a manner exactly analogous to that used in the construction of Fourier tuning cubes.

Finally, although the discrete Fourier transform is a transform that is characterized by a set of orthonormal basis functions, application of a non-trivial weight function to the basis functions prior to computation of a transformation destroys their orthonormality. Under conventional theory, a weight function that is applied within a window is viewed as being applied to the basis functions rather than the data, thereby preserving the integrity of the underlying data. However, basis functions that were orthogonal before application of the weight function will generally no longer be so thereafter. That being said, in point of fact whether the weight function is applied to the data or to the basis functions, the end computational result after transformation is exactly the same.

One means of avoiding the minor theoretical dilemma that arises when a weight function is used with a discrete orthonormal transform is to select an orthonormal transform/weight combination which is not so affected. By way of example, the local cosine (and local sine) transform is a discrete orthonormal transform wherein the weight function of choice is a smooth, specially designed taper that preserves the orthonormality of the basis functions at the expense of some loss in frequency resolution. Further, the underlying rationale of the local cosine/sine transform provides a natural theoretical bridge to the field of general wavelet transforms.

BRIEF DESCRIPTION OF THE DRAWINGS

FIG. 3A illustrates the spectrum of a typical seismic source wavelet and FIG. 3B illustrates the spectrum of that same wavelet after reflection by a thin bed.

FIGS. 4a–4c contains a simple seismic pinch out model, the convolutional response thereto, and the frequency domain representation of said convolutional response.

DETAILED DESCRIPTION OF THE PREFERRED EMBODIMENTS

The instant invention provides a method of processing seismic data using a discrete Fourier transform, whereby its utility as a detector of thin beds is enhanced.

Figure 5:
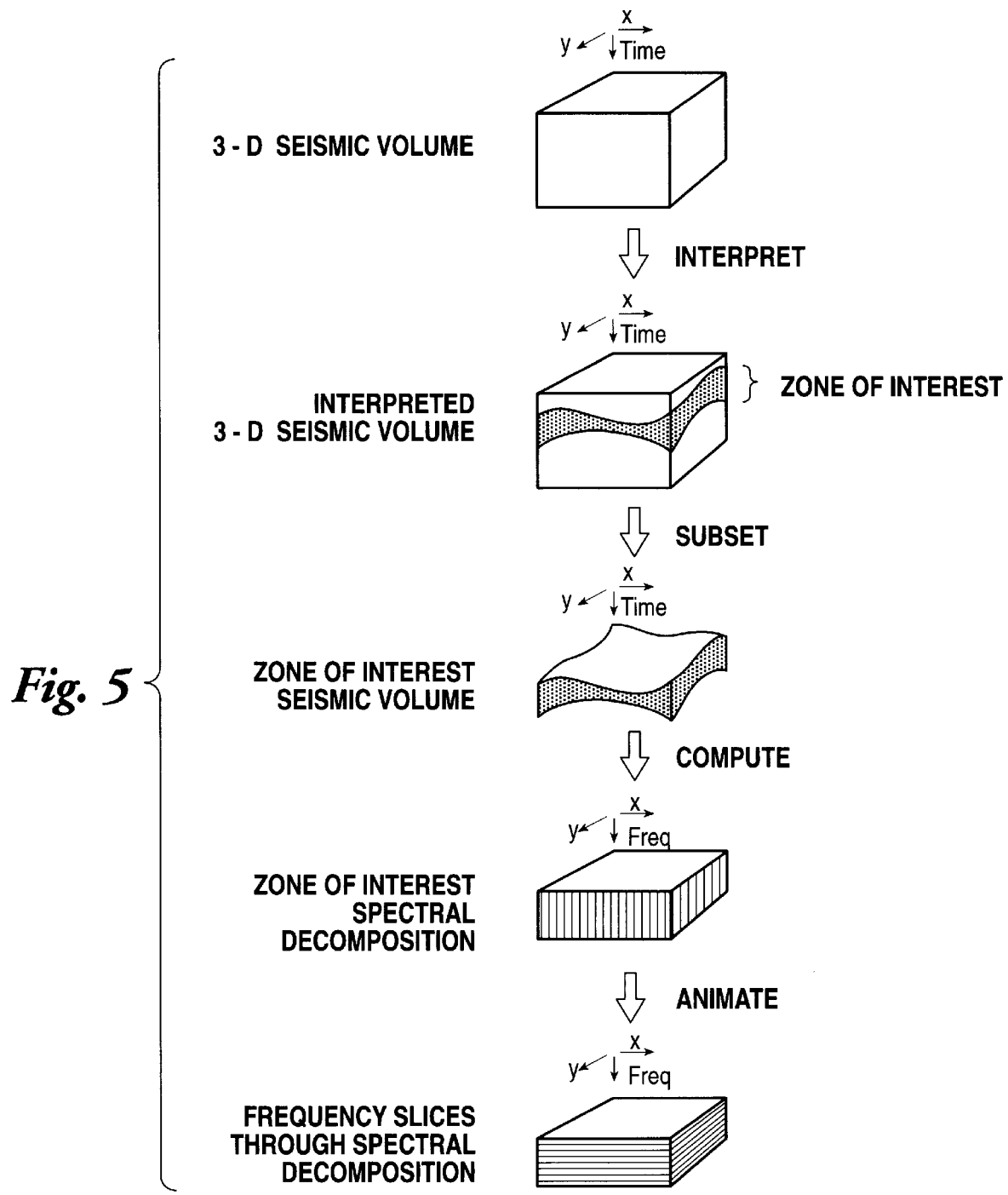
FIG. 5 is a schematic diagram that illustrates the general approach of a presently preferred embodiment.

According to a first aspect of the present invention, there has been provided a method of enhancing and viewing thin bed effects using a discrete Fourier transform wherein a single Fourier transform is calculated for a window spanning the zone of interest and the coefficients obtained therefrom are thereafter displayed in a novel manner. As is illustrated generally in FIG. 5, let x(k,j,nt) represent a 3-D seismic data volume, where k=1, K, and j=1, J, represent indices that identify a specific trace within a given 3-D volume. By way of example only, these indices might be in-line and cross-line position numbers, although other location schemes are also possible. The variable "nt" will be used to represent the time (or depth) position of within each seismic trace, nt=0, NTOT-1, the total number of samples in each individual trace. The time separation between successive values of x(k,j,nt) (i.e., the sample rate) will be denoted by $\Delta t$, where $\Delta t$ is customarily measured in milliseconds. Each trace in the 3-D volume, therefore, contains a recordation of (NTOT)*$\Delta t$ milliseconds of data, the first sample conventionally taken to occur at "zero" time. That being said, those skilled in the art understand that some seismic data that are eminently suitable for analysis by the invention disclosed herein are not ordered in terms of "time". By way of example only, seismic data samples that have been processed by a depth migration program are stored within a seismic trace in order of increasing depth, $\Delta z$. However, the instant invention can and has been applied in exactly the same fashion to this sort of data. Thus, in the text that follows $\Delta t$ (and "time") will be used in the broader sense of referring to the separation between successive digital samples, whatever measurement form that separation might take.

Figure 11:
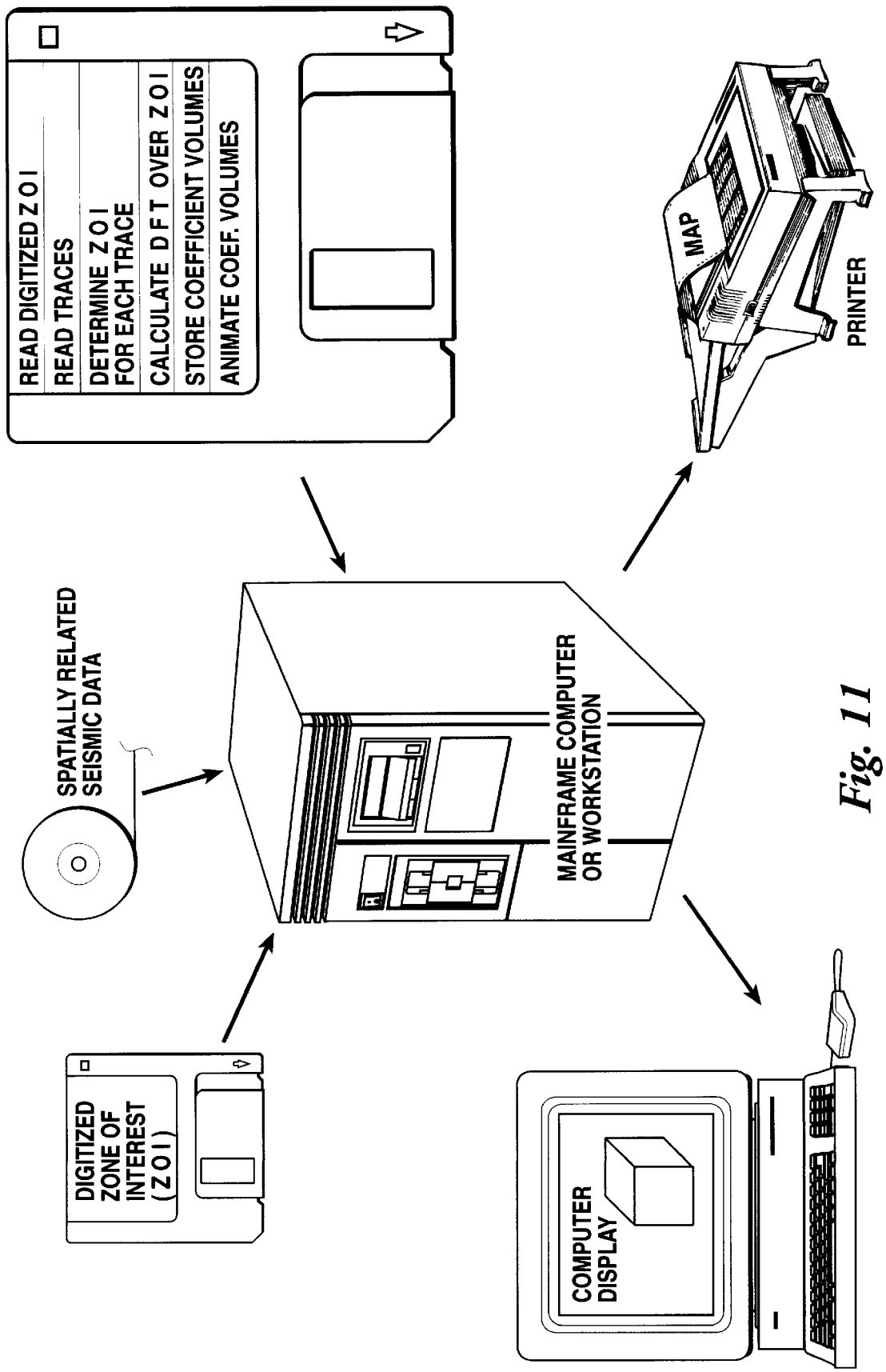
FIG. 11 is a schematic illustration of another presently preferred embodiment.

As a first step, the explorationist or seismic interpreter selects a zone of interest within the 3-D volume. This might be done, by way of example only, by digitizing time picks ("picking") seismic events either on a digitizing table or, more commonly, at a seismic workstation. When an event is picked, the explorationist attempts to pinpoint the same reflector feature (e.g., peak, trough, zero crossing, etc.) on every seismic trace in which it appears, the ultimate goal being the production of a computer file that contains time and surface location information that tracks the event across a 2-D section or through a 3-D volume. As illustrated in FIG. 11, given this information a computer program can be designed to read the picks and find the zone of interest for any trace within the data volume, and/or perform the method of the present invention. Said program might be transported into the computer, for example, by magnetic disk, tape, optical disk or CD-ROM.

Alternatively, the interpreter might simply specify constant starting and ending times which bound the event of interest throughout the entire volume, thereby creating a "cube" of interest, where "cube" is used in the generic sense to represent a 3-D sub-volume of the original 3-D survey volume. For purposes of illustration only, the discussion that follows will assume that a 3-D sub-cube has been extracted, although those skilled in the art will recognize that the same techniques discussed below can easily be adapted to a window that is not constant in time. Again, just for purposes of illustrating the disclosed techniques, the temporal zone of interest, after extraction, will be assumed to extend from the first sample of the 3-D sub-volume, to last sample, sample number "N" hereinafter. Similarly, it will also be assumed hereinafter that the zone of interest is present on every trace in the sub-volume, although those skilled in the art will recognize that it is often the case that the zone of interest extends to only a portion of the 3-D volume.

Given a zone of interest, the next step is to select a Fourier transform window length, "L" hereinafter. Generally speaking, the length of the transform should be no longer than is absolutely necessary to encompass the zone of interest. Conventionally, the length of the Fourier transform is selected for purposes of computational efficiency and is usually restricted to an integer power of 2 (e.g., 32, 64, 128, etc.), thereby allowing the highly efficient FFT calculation algorithm to be utilized, rather than a somewhat less efficient mixed radix Fourier transform or a much less efficient general discrete Fourier transform. However, within the context of the present invention the inventors specifically recommend against extending the chosen window length, as is conventionally done, to an integer power of two: a general discrete Fourier transform should be used instead. That being said, in the discussion that follows, it is understood by those skilled in the art that whenever a discrete Fourier transform is called for, an FFT will be calculated if appropriate. Otherwise, a general discrete Fourier transform, or some mixed radix variant, will be selected if the chosen window length is not an integer power of 2.

Before beginning the Fourier transformations, an auxiliary storage volume must be established in which to store the calculated Fourier coefficients. Auxiliary storage least as large as L computer words in extent must be provided for each trace in which to save the calculated transform coefficients, with even more storage being required if the seismic data values or the transformed results are to be kept as double (or higher) precision. By way of explanation, a Fourier transform of a real time series of length L requires storage for L/2 complex data values, each of which normally requires two computer words of storage. (There are actually only [(L/2)-1] unique complex data values, rather than L, because for a real time series the Fourier transform coefficients corresponding to positive and negative frequencies are directly related: they are complex conjugate pairs. In addition, there are two real values: the coefficient at zero ("dc") hertz and the coefficient at the Nyquist frequency, both of which could be stored in a single complex data value. Finally, if L is an odd integer, the number of unique data values is (L+1)/2). If there are a total of J times K seismic traces within the zone (cube) of interest, the total amount of auxiliary storage required will be equal to, at minimum, the product of L, J, and K measured in computer words. Let, the array A(k,j,nt) represent an auxiliary storage area for the present embodiment.

Figure 8:
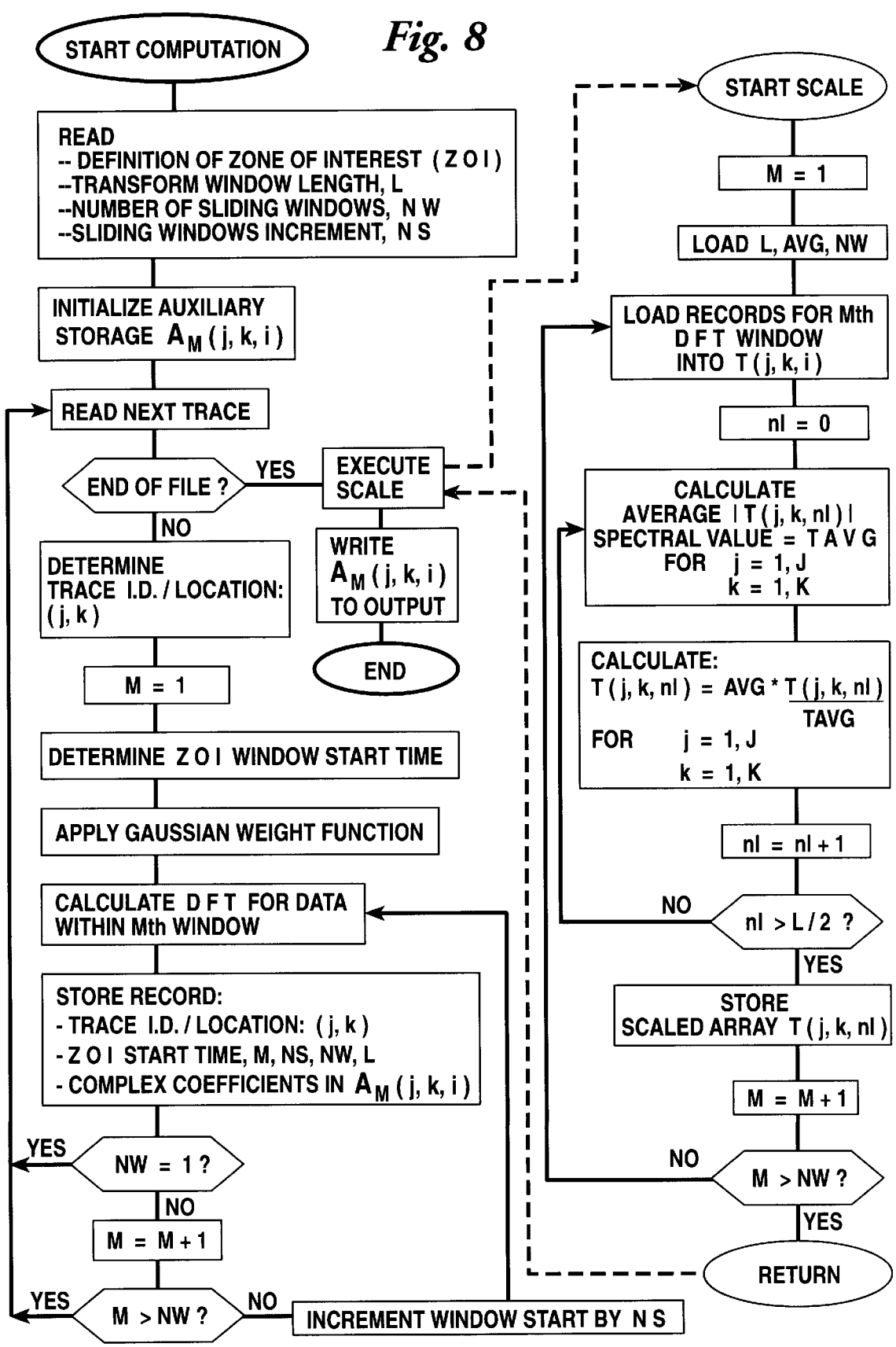
FIG. 8 is a flow chart that illustrates a presently preferred embodiment.

As a first computational step, and as illustrated in FIG. 8, the data values within the zone of interest are extracted from an input trace xo,k,nt) taken from the sub-volume:

$$y(nl)=x(j,k,nl), \; nl=0, L-1$$

and the weight function is optionally applied:

$$y(nl)=y(nl)w(nl), \; nl=0, L-1,$$

where the array y(nl) is a temporary storage area. (Note that in this present embodiment, the length of the analysis window is equal to the length of the zone of interest.) The weight function w(t), or data window as it is referred to by some, could take any number of forms. Some of the more popular data windows are the Hamming, Hanning, Parzen, Bartlett, and Blackman windows. Each window function has certain advantages and disadvantages. The present inventors, however, have discovered that the use of a Gaussian window is in many ways optimal for this application. The Gaussian weight function is defined by the following expression:

$$w(nl) = \sigma_3 e^{(-nl-L/2)^2/\sigma_2}, \; nl = 0, L-1$$

where, $$\sigma_1 = \frac{L}{6}, \; \sigma_2 = 2\sigma_1^2, \; \sigma_3 = \frac{1}{\sqrt{2\pi\sigma_1}}.$$

In general, though, the weight function should be a real function and non-zero over its range.

After the weight function has been applied, the discrete Fourier transform is then calculated according to the following standard expression:

$$X(n) = \sum_{k=0}^{L-1} y(k)e^{-2\pi i k n/L}, \; n = -\frac{L}{2}, \ldots, 0, \ldots \frac{L}{2} - 1,$$

where X(n) represents the complex Fourier transform coefficient at the frequency, $f_n$, said frequency being dependent on the length of the window L. In general, it is well known that the Fourier transform produces coefficients that provide estimates of the spectral amplitude at the following Fourier frequencies:

$$f_n = \frac{n}{L(\Delta t/1000)}, \; n = -\frac{L}{2}, \ldots, 0, \ldots \frac{L}{2} - 1.$$

It should be noted in passing that the nominal sample rate of a seismic trace, $\Delta t$, may not be the same sample rate at which the data were acquired in the field. For example, it is common practice to resample a seismic trace to a larger sample rate to save storage when there is little useful information at the highest recorded frequencies. On the other hand, on occasion a seismic trace may be resampled to a smaller sampling rate when, for example, it is to be combined with other—higher sample rate—lines. In either case, the nominal sample rate of the data may not accurately reflect its true spectral bandwidth. A simple modification of the previous equation will accommodate that contingency:

$$f_n = \frac{n}{L} F_{max}, n = -\frac{L}{2}, \ldots, 0, \ldots \frac{L}{2} - 1,$$

where $F_{max}$ is the highest frequency contained in the data.

Since a seismic trace is a "real" function (i.e., non-imaginary), its Fourier transform is symmetric and the Fourier coefficients corresponding to the positive and negative frequencies are related as follows:

$$RE[X(f_n)]=RE[X(f_{-n})],$$

and $$IM[X(f_n)]=-IM[X(f_{-n})],$$

where RE[z] is a function that extracts the real portion of the complex value z, and IM[z] extracts the imaginary portion. As a consequence of this relationship, only L/2+1 unique values are produced within each Fourier transform window. Thus, for purposes of specificity, only the positive frequencies will be considered in the discussion that follows, although those skilled in the art understand that the same results could have been obtained by utilizing only the negative frequencies.

A next step in the process involves placing the calculated complex frequency values into the auxiliary storage array. These traces are filled with the calculated complex Fourier coefficients as indicated below:

$$A(j,k,i)=X(i), \; i=0, L/2,$$

wherein, "j" and "k" match the indices corresponding to the original data trace. In practice, the array A(j,k,i) may not ever actually be kept entirely in RAM (random access memory) at one time, but may be located, in whole or in part, on tape, disk, optical disk, or other storage means. Additionally, because the presently preferred thin bed display requires the use of the frequency spectrum rather than the complex values, it would be convenient at the same time to calculate the complex magnitude as each coefficient is placed into the auxiliary storage array:

$$A(j,k,i)=|X(i)|, \; i=0, L/2.$$

However, there are many circumstances in which the complex coefficients would be needed and useful, so, as indicated in FIG. 8, the complex coefficients are preferentially stored in the auxiliary storage area.

Figure 10:
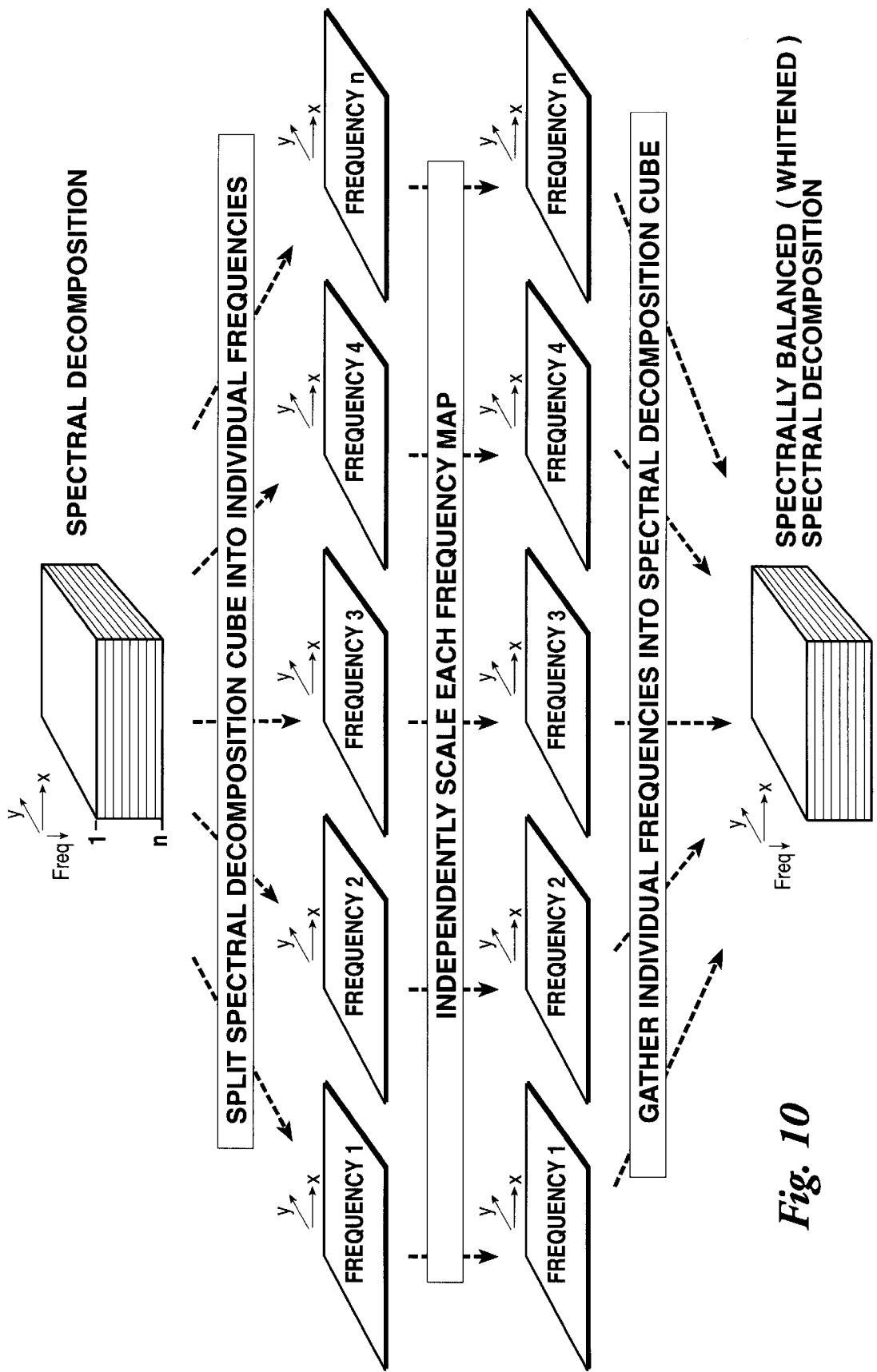
FIG. 10 illustrates the general approach utilized to scale the constant frequency slices so as to enhance the geologic content of the transformed data.

The procedure described above is repeated for every trace in the defined sub-volume, thereby filling the auxiliary storage array with transform coefficients in preparation for viewing by the explorationist. Before viewing the results, however, the data are preferentially scaled in a novel fashion, whereby the geological information within the transform coefficients is emphasized relative to the contribution of the wavelet. This general method involved in this frequency domain scaling is illustrated in FIG. 10. The scaling method disclosed herein is designed to equalize the average spectral amplitude in each frequency slice, thereby tending to produce a whitened wavelet spectrum. As illustrated in some detail in FIG. 8, Let T(j,k,i) represent a temporary storage array into which an entire tuning cube will be stored. For a given frequency slice, i, calculate the average spectral amplitude therein:

$$TAVG = \frac{1}{JK} \sum_{j=1}^{J} \sum_{k=1}^{K} |T(j,k,i)|.$$

The spectral magnitude has been calculated because the T(j,k,i) are potentially complex valued. As a next step, the values in this particular frequency slice are adjusted so that their average is equal to some user specified constant value, represented by the variable AVG:

$$T'(j,k,i) = \frac{AVG}{TAVG} T(j,k,i), j = 1,J, k = 1,K,$$

where the primed notation has been used to indicate that the T(j,k,i) array has been modified. In practice, AVG will be set to some specific numerical value, 100, for example. This scaling operation is repeated separately for every frequency slice (i=0, L/2) in the tuning cube volume. At the conclusion of this operation, every slice has the same average amplitude and a kind of spectral balancing has been performed. Note that this form of single-frequency scaling is just one scaling algorithm that could be applied to the tuning cube data and the instant inventors have contemplated that other methods might also be used to advantage. By way of example, rather than computing the arithmetic average of the items in the a slice, another measure of central tendency or any other statistic could have been equalized instead (e.g., median, mode, geometric mean, variance, etc.). As another example, rather setting the average value in each frequency slice equal to the same constant, each slice could be set equal to a different constant average value, thereby enhancing some frequencies in the spectrum and suppressing others.

If the scaled tuning cube data are now inverted back into the time domain using a standard Fourier transform inverse, a spectrally balanced version of the original input seismic traces are thereby obtained. Let X(k) represent a scaled collection of transform coefficients obtained by the previously disclosed process and taken from location (j,k) within the scaled tuning cube array.

Then, a spectrally whitened version of the input data may be obtained by means of the following equation:

$$x'(j,k,nl) = \frac{1}{L} * \frac{1}{w(nl)} \sum_{k=0}^{L-1} X(k) e^{+2\pi i k(nl)/L}, nl = 0, L-1$$

where x'(j,k,nl) represents the now modified (spectrally balanced) version of the input data x(j,k,nl). The divisor w(nl) is there to remove the effects of the weight function that was applied prior to transformation. That term may be omitted if no weight was applied in the forward transform direction.

However, rather than inverting the scaled tuning cube, the presently preferred use for it is as an exploration tool for detecting thin beds. After all of the traces have been processed and placed in auxiliary storage, horizontal (constant frequency) amplitude slices, $S_i(j,k)$, corresponding to the "ith" frequency may be extracted from Ao,k,i) for viewing and/or animation:

$$S_i(j,k) = |A(j,k,i)|.$$

When these slices are animated (i.e., viewed rapidly in succession) thin beds will be recognizable as those events that successively alternate between high and low amplitude values. Further, for many sorts of thin beds, there will be a characteristic pattern of moving notches that clearly signal that an event is generated by a thin bed. Note that it is preferable for the method disclosed herein that the slices be ordered in terms of frequency (either strictly increasing or decreasing) when they are animated and viewed.

Figure 9A:
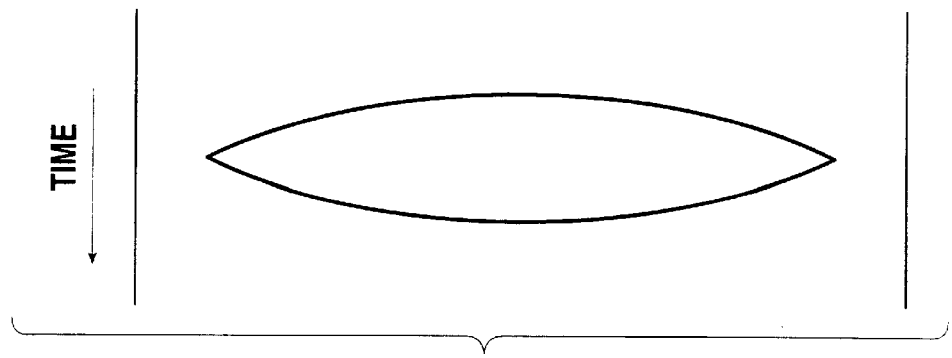
FIGS. 9a–9c is a schematic illustration that describes the appearance of a thin bed during animation of constant frequency slices.
Figure 9B:
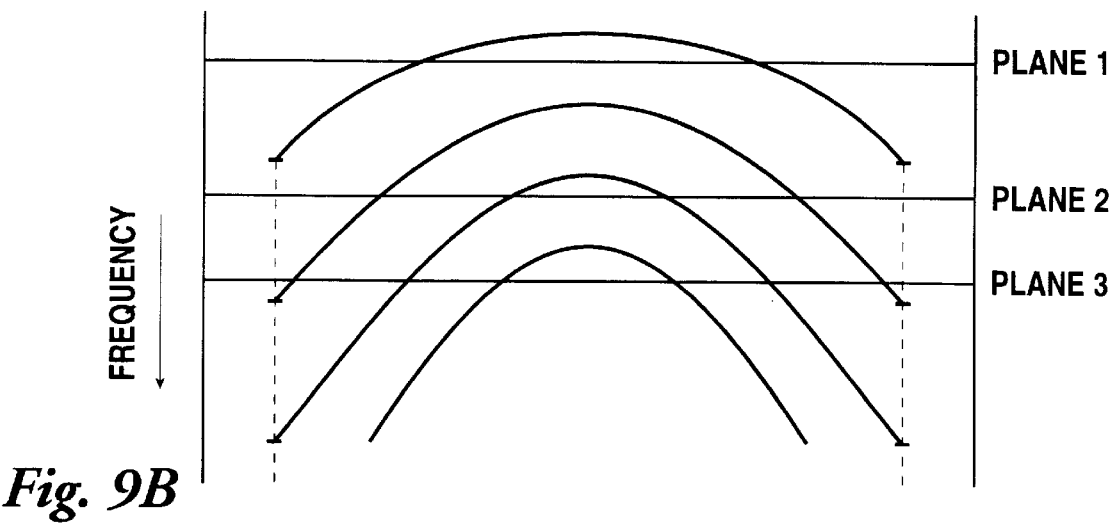
Figure 9C:
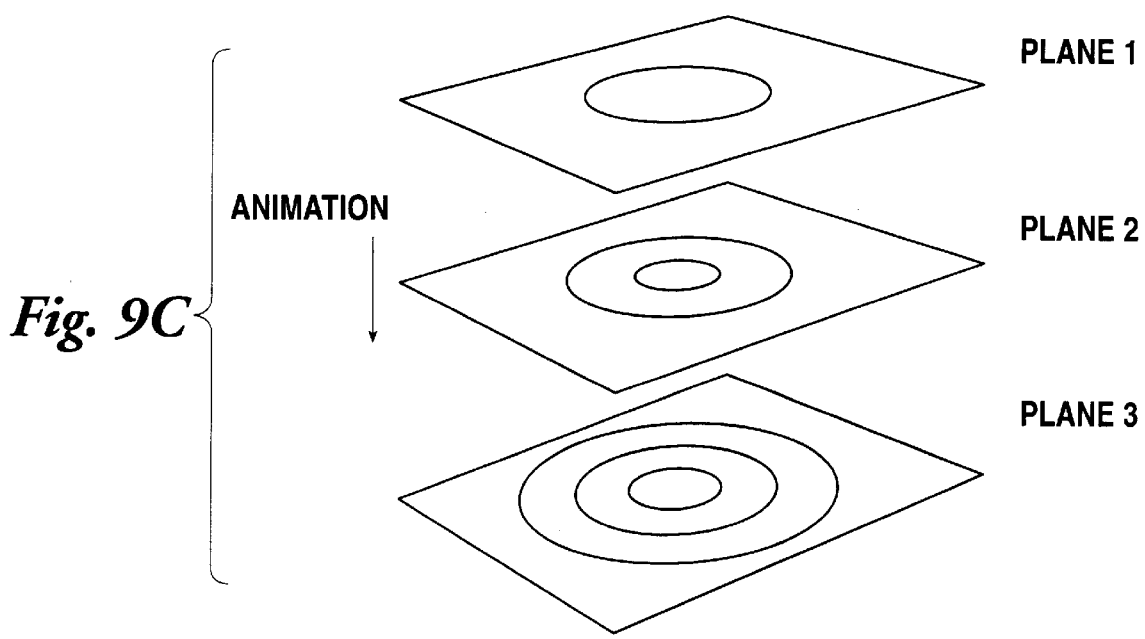

FIGS. 9a–9c illustrates the source of this diagnostic moving pattern. FIG. 9a contains a lens-type geologic thin bed model and FIG. 9b a stylized Fourier transform of said model, wherein only the notches have been drawn. As discussed previously, the notches are periodic with period equal to the inverse of the temporal thickness of the model at that point. Now, consider the model in FIG. 9a as representing a 2-D cross section of a 3-D (disk-type) radially symmetric model, and FIG. 9b as a similarly radially symmetric collection of one dimensional Fourier transforms of said 3-D model. If the constant frequency plane labeled Plane 1 is passed through the volume as indicated, the plan view display of said plane will reveal a low amplitude circular region corresponding to the first notch. Plane 2 passes through two notches and exhibits two low amplitude circular regions. Finally, Plane 3 contains three low amplitude circular regions, corresponding to the three notches that it intersects. Now, when these slices are viewed in rapid succession in order of increasing frequency, there is a visual impression of a growing "bulls eye" pattern wherein the rings move outward from the center. This pattern of moving notches is diagnostic for thin beds.

When the thin bed is not circular, a related pattern is observed. Rather than concentric circles though, there will appear a series of moving notches that progress from away from the thicker areas and toward the thinner ones. For example, consider the model of FIGS. 9a–9c as a cross section of a lens-shaped stream channel. When viewed in successive plan view frequency slices, a pattern of outward moving notches—moving from the center of the channel toward its periphery—will be observed all along its length.

Figure 1A:
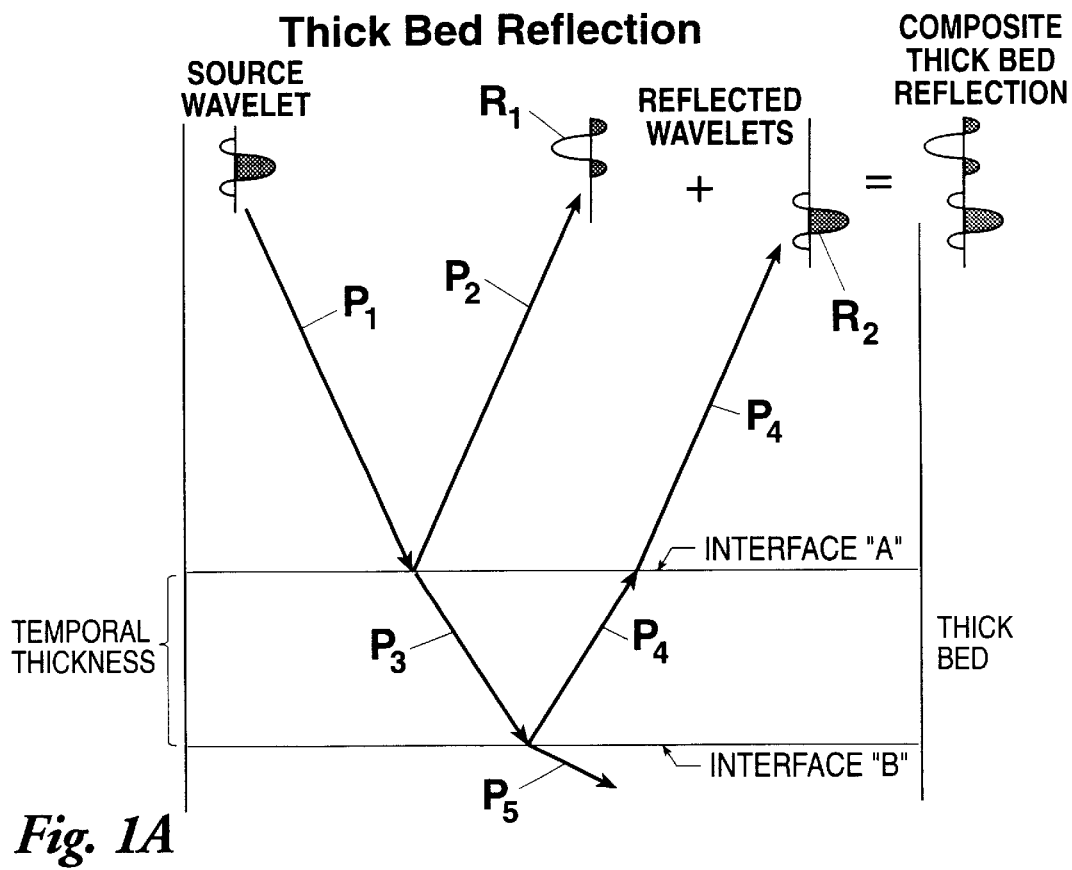
FIGS. 1a and 1b is a schematic diagram that illustrates generally the nature of the thin bed problem.
Figure 1B:
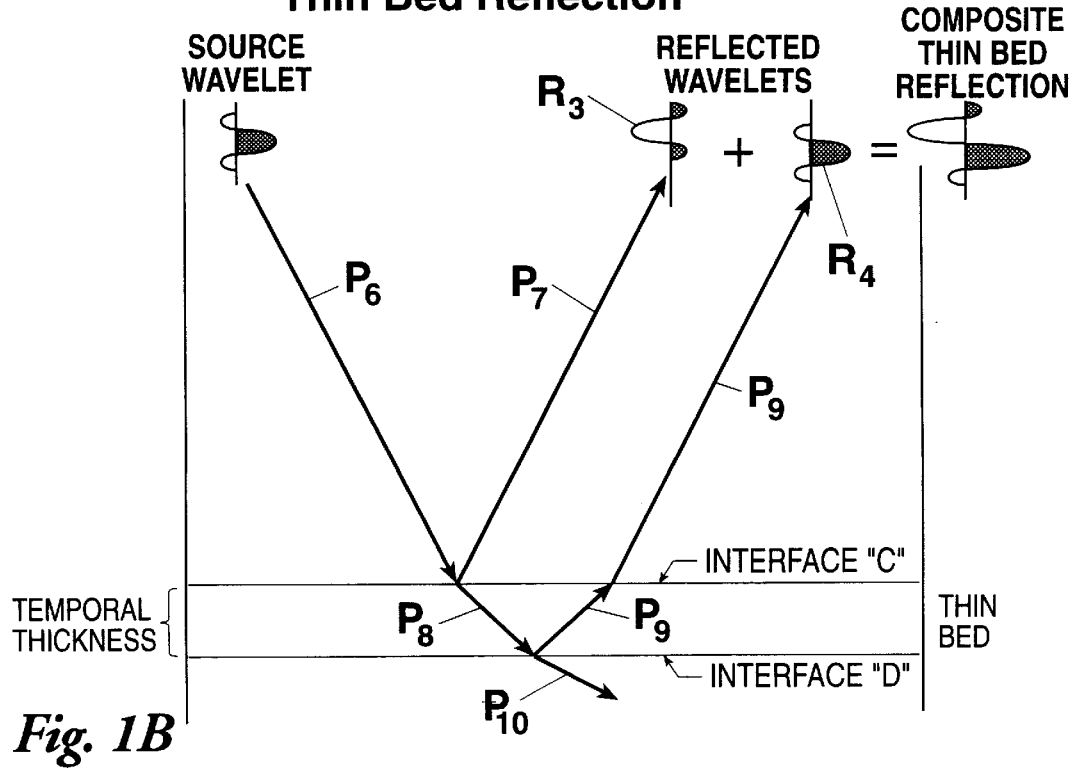
Figure 2:
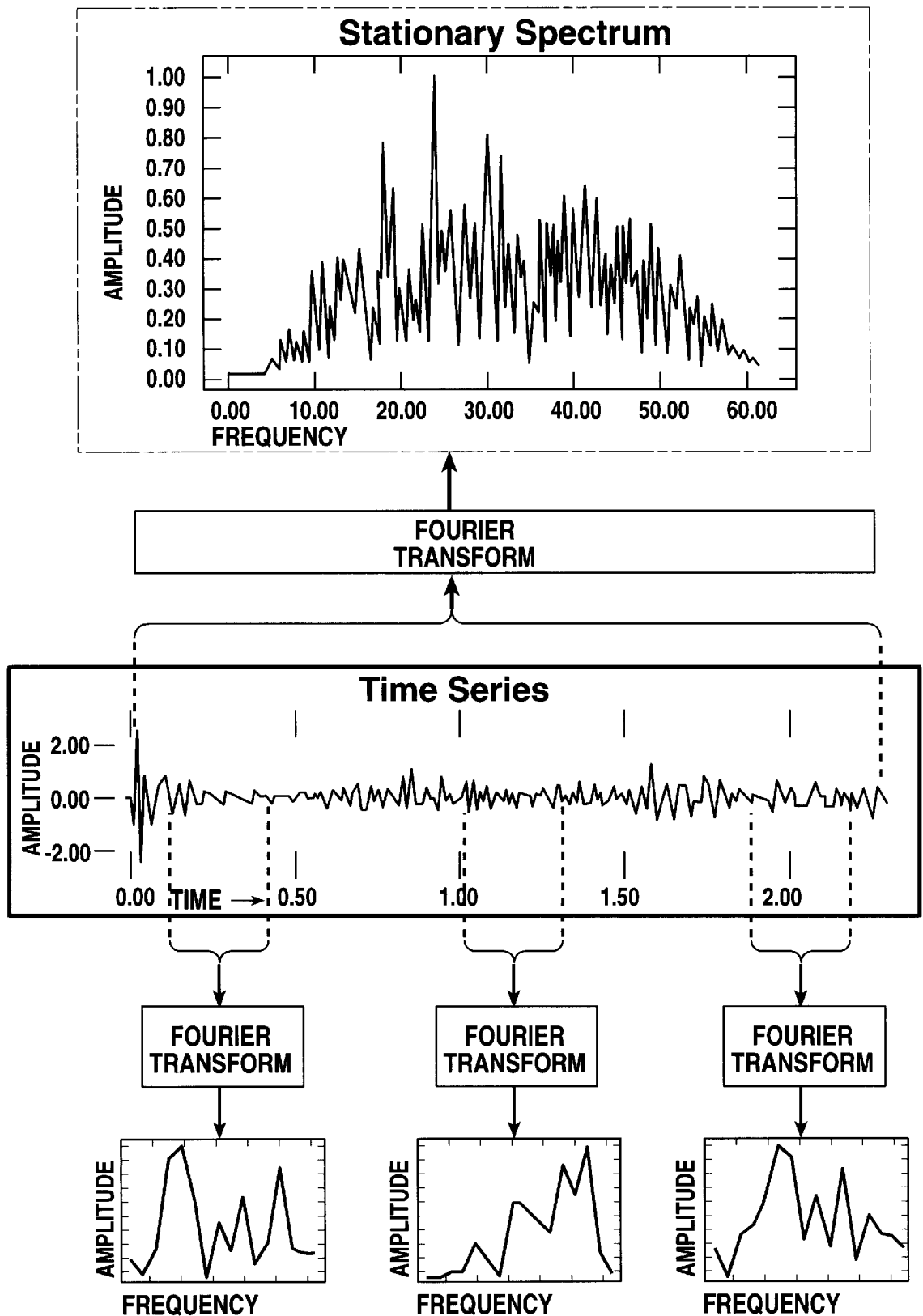
FIG. 2 displays a typical seismic trace and compares long and short window spectra computed therefrom.
Figure 4A:
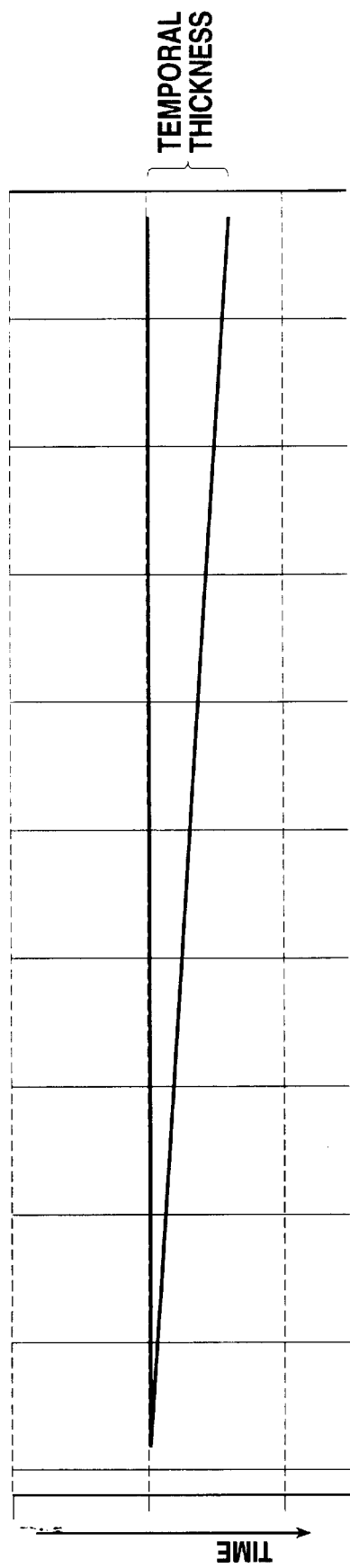
Figure 4B:
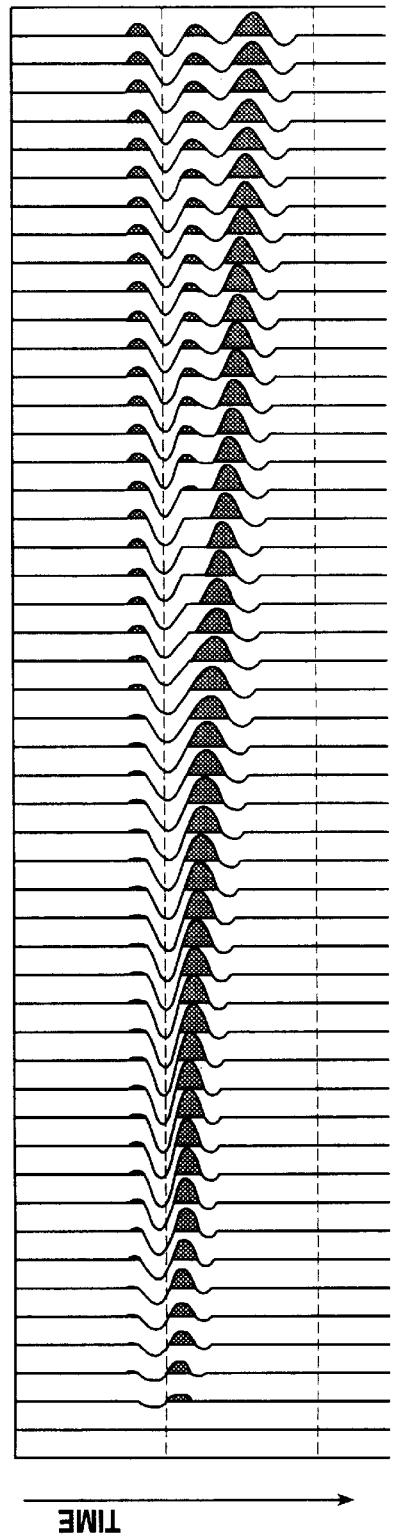

It should be noted that if the thin bed is not homogeneous, for example if it contains a gradational velocity increase or decrease, it may not exhibit the characteristic "notch" pattern of the homogeneous thin bed, but rather have some different frequency domain expression. In these cases, the preferred method of identifying the characteristic response is to create a model of the event and calculate its Fourier transform, as was illustrated previously in FIG. 4b. Armed with this information, an explorationist may then examine an animated tuning cube for instances of the predicted response.

Not only is the pattern of notches a qualitative indication of a homogeneous thin bed, but it is also yields a quantitative measure of the extent of the thin bed. Returning to FIGS. 9a–9c, note that notches are limited in lateral extent by the outer most edges of the model. Thus, by panning through a stack of frequency slices and noting the outermost limits of movement by the notches, a quantitative estimate of the extent of the bed may be obtained.

The foregoing is a striking visual effect that can be readily observed in actual seismic data volumes. Since the typical non-thin bed event will have a somewhat consistent and slowly changing amplitude spectrum, the thin bed response is distinctive and easily identified. Note that in the present embodiment where a single window is calculated for the entire zone of interest, the actual time position (i.e., depth) of the thin bed within the zone of interest is not particularly important. If the thin bed is located anywhere within the temporal zone of interest, the spectrum for that window will exhibit the characteristic moving notch pattern. Those skilled in the art will understand that moving the location of an event in time does not change its amplitude spectrum. Rather, it only introduces a change in the phase which will not be apparent if the amplitude spectrum is calculated and viewed.

As an alternative to displaying the amplitude spectra in animated plan view, the present embodiment may also be used with any number of other attributes calculated from the complex values stored in the tuning cube. By way of example, the phase of the complex transform coefficients provides another means of identifying thin bed events and, more generally, lateral discontinuities in the rock mass. The phase tuning cube is calculated as follows:

$$P(j,k,i) = \tan^{-1}\left(\frac{IM(A(j,k,i))}{RE(A(j,k,i))}\right)$$

where, $P(j,k,i)$ contains the phase portion of the complex Fourier transform coefficients for every point in the original tuning cube. Phase sections have long been used by those skilled in the art to assist in picking indistinct reflectors, a phase section tending to emphasize continuities in the seismic data. In the present embodiment however, it is lateral discontinuities in the spectral phase response that are indicative of lateral variability in the local rock mass, of which truncation of thin beds is a prime example. When viewed in animated plan view, the phase values in the vicinity of a lateral edge will tend to be relatively "unstable": tending to have an ill-behaved first derivative. Thus, the edges of thin beds and, more generally, lateral discontinuities in the rock mass (e.g., faults, fractures, non-conformities, unconformities, etc.) will tend to have a phase that contrasts with surrounding phase values and will be, therefore, relatively easy to identify. This behavior may used either by itself to identify lateral boundaries or in tandem with the amplitude spectrum tuning cube as a confirmation of the presence of local rock mass variability.

Finally, it is anticipated by the instant inventors that the tuning cube technology disclosed herein might yield additional insights into seismic reflection data. The tuning cube (either containing phase or amplitude data) might be displayed and examined for empirical correlations with subsurface rock contents, rock properties, subsurface structure or layer stratigraphy. Alternatively, the Fourier transform values stored in the tuning cube may be further manipulated to generate new seismic attributes that can be useful in exploration settings. By way of example only, attributes that could be calculated from the tuning cube values include the average spectral magnitude or phase, and any number of other attributes. The importance of this aspect of the present invention is best described as follows. It is well known in the seismic interpretation arts that spatial variations in a seismic reflector's character may often be empirically correlated with changes in reservoir lithology or fluid content. Since the precise physical mechanism which gives rise to this variation in reflection character may not be well understood, it is common practice for interpreters to calculate a variety of seismic attributes and then plot or map them, looking for an attribute that has some predictive value. The attributes produced from the tuning cube calculations represent localized analyses of reflector properties (being calculated, as they are, from a short window) and, as such, are potentially of considerable importance to the advancement of the interpretation arts.

Figure 6:
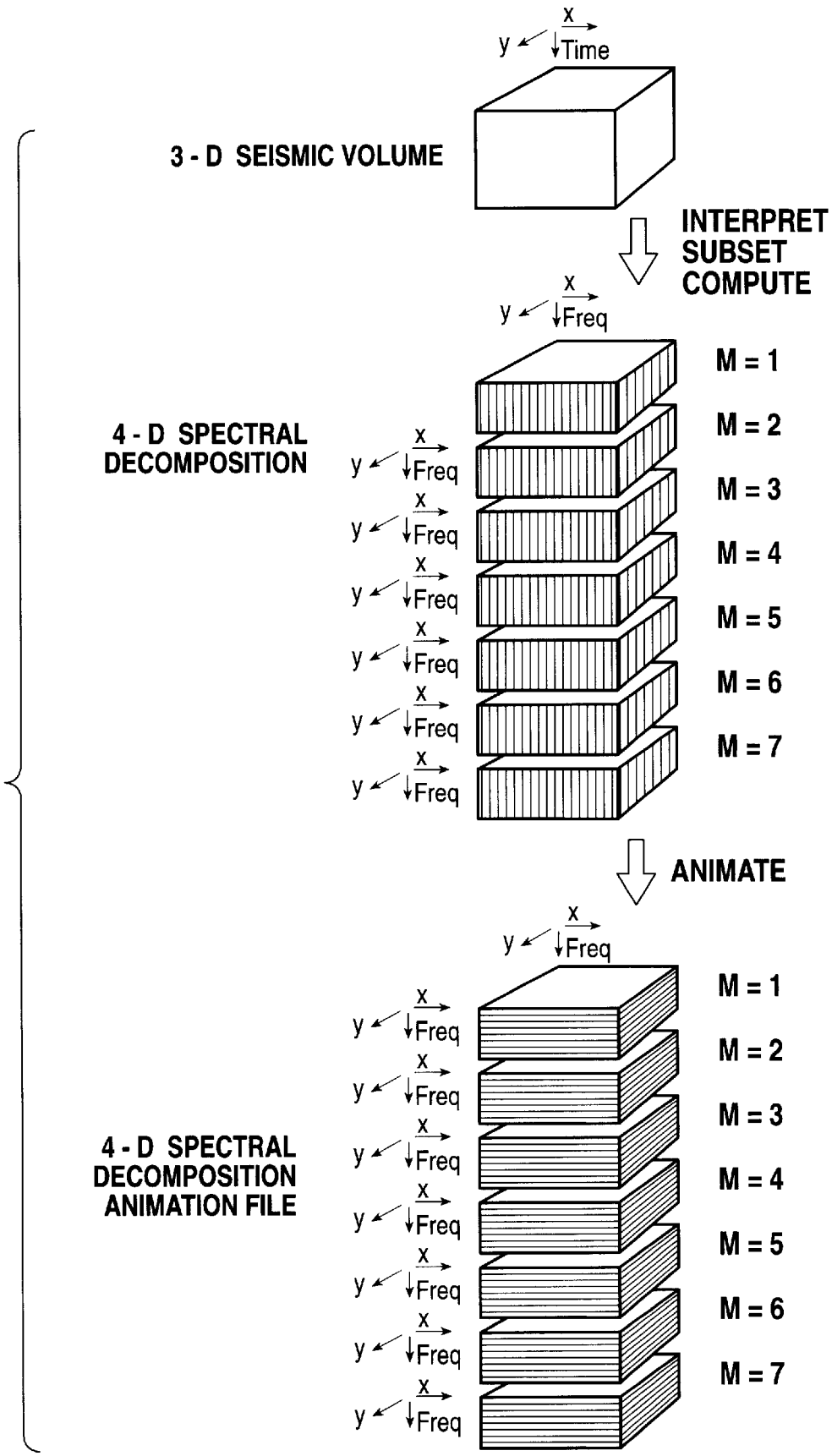
FIG. 6 contains a schematic illustration of how a presently preferred embodiment of the present invention is used in an exploration setting.

According to a second aspect of the present invention, there has been provided a method of enhancing thin bed effects using a discrete Fourier transform wherein a series of sliding short-window Fourier transforms are calculated over a window spanning the zone of interest and thereafter displayed in a novel manner. This method is illustrated generally in FIG. 6 and in more detail in FIG. 8. Conceptually, the present embodiment may be thought of as producing a series of tuning cubes of the sort disclosed previously, one tuning cube for each Fourier transform window position specified by the user.

Once again $x(k,j,n)$ represents a 3-D seismic data volume and "L" the length of the chosen sliding-window Fourier transform. In this present embodiment "L" will generally be substantially shorter than the length of the zone of interest, N. As before, the length of the Fourier transform window is to be selected, not on the basis of computational efficiency, but rather with the intent of imaging particular classes of thin bed events in the subsurface. By way of example, a reasonable starting point for the transform length is one that is just long enough to span the "thickest" thin bed within the zone of interest. Note that it may be necessary to increase this minimum length in circumstances where, for instance, the waveform is not particularly compact. In this later case, the minimum window length might be increased by as much the length of the wavelet measured in samples.

The integer variable, NS, will be used to represent the increment in samples that is applied to successive windows. For example, if NS is equal to 1, a short window Fourier transform will be calculated at every possible starting position within the zone of interest, with successive sliding windows differing by only a single sample. If NS is equal to 2, successive windows will share all but two of the same data values and transforms will be calculated at every other star The Fourin within the zone of interest.

The Fourier transform coefficients in the present embodiment are calculated as follows. Beginning at the top of the zone of interest for a particular seismic trace, a series of sliding window Fourier transforms of length L are computed for each feasible position within said zone of interest. As illustrated in FIG. 8, let the integer variable "M" be a counter variable that represents the current sliding window number. M is set initially equal to unity to signify the first sliding window position.

Now, for the trace at location (j,k) within the seismic data sub-volume $x(j,k,i)$, the data for the Mth sliding window may be extracted and moved into short-term storage, said sliding window starting at sample number (M-1)*NS:

$$y(nl)=x(j,k,(M-1)*NS+nl), \; nl=0,L-1,$$

and thereafter transformed via a Fourier transform. As disclosed previously, a weight function may optionally be applied to the data before transformation. For a fixed value of M, applying the previous calculation to every trace in the sub-volume will produce a tuning cube for this particular window position. Similarly, incrementing M and passing the entire data volume through the algorithm again results in another complete tuning cube, this one calculated for a window location that begins NS samples below the previous window.

The Fourier coefficients may now be placed in auxiliary storage until they are to be viewed. The notation developed above must be modified slightly to accommodate the fact that several windows might possibly be applied to each individual trace. Let $A_M(j,k,i)$ represent the volume of collected of Fourier transform coefficients taken from all traces in the zone of interest for the "M"th calculated window position. Note that the amount of storage that must be allocated to this array has increased markedly. Now, the total amount of storage depends on the number of sliding windows calculated for each trace, say NW, and must be at least as may words of storage as the product of NW L, J, and K:

*Storage=(NW)(L)(J)(K).*

As was mentioned previously, it is entirely possible that $A_M(j,k,i)$ may never be kept completely in RAM, but instead kept partially in RAM and the remainder on disk.

Using the array notation introduced above and again assuming that the Fourier transform of the weighted data is stored in X(i), the transform coefficients for the Mth window of trace (i,j) are stored in array location:

$A_M(j,k,i)=X(i), i=0,L/2.$

Once again, the individual frequency slices within the numerous tuning cubes stored in $A_M(j,k,i)$ are preferably scaled by the procedure disclosed in FIG. 8 prior to their examination for thin bed artifacts. In each case, the horizontal frequency slices are individually scaled so that their average value is set to some particular constant, thereby whitening the spectra.

After processing the seismic traces within the zone of interest, each tuning cube may be individually examined for evidence of thin bed effects. As before, thin bed effects may be identified in the amplitude spectra by viewing a series of horizontal slices corresponding to different frequencies. Furthermore, this may be separately done for the tuning cube corresponding to each window position, thereby obtaining some general indication as to the temporal and spatial extent of a particular thin bed event.

Figure 7:
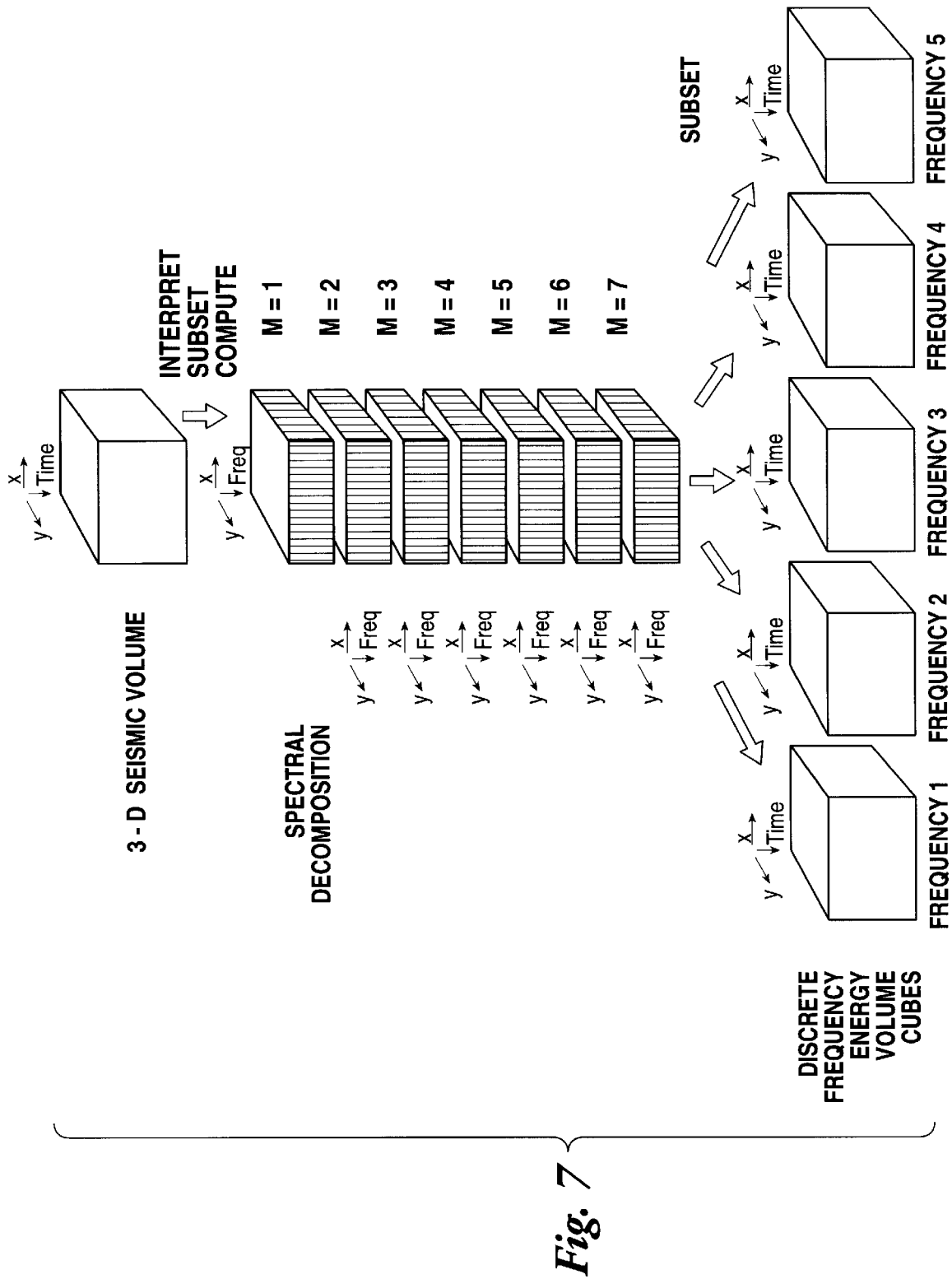
FIG. 7 is a schematic illustration of another presently preferred embodiment.

According to a third aspect of the present invention, there has been provided a method of enhancing thin bed effects using a discrete Fourier transform in the manner described above for the second embodiment, but containing the additional step of organizing the Fourier transform coefficients into single-frequency volumes prior to display and analysis. This method is illustrated generally in FIG. 7. As disclosed supra in connection with the second embodiment, the auxiliary storage array $A_M(j,k,i)$ will be filled with Fourier transform coefficients and will be preferably scaled.

Let F(j,k,m) represent a single-frequency volume extracted from $A_M(j,k,i)$. There will be L/2+1 different volumes ((L+1)/2 values if L is odd), one for each Fourier frequency produced by a transform of length "L". A volume corresponding to the "i"th Fourier frequency is extracted from $A_M(j,k,i)$ as follows:

$F(j,k,m)=A_m(j,k,i), m=1,NW, j=1,J, k=1,K.$

In effect, the array F(j,k,m) may be viewed conceptually as being constructed by taking horizontal slices from each of the sliding window volumes and stacking them in order of increasing short window counter, M.

The advantage of this present data organization for purposes of thin bed recognition is that it provides a means by which the location of the thin bed event in time and space may be determined. By way of explanation, as was indicated previously the temporal location of the thin bed within the zone of interest does not affect its response: thin beds near the top of the zone of interest and thin beds near the bottom produce the same characteristic amplitude spectra. This is advantageous from the standpoint of identifying thin beds, but it is a disadvantage in terms of determining their potential for hydrocarbon accumulation—higher bed elevations being generally preferable.

However, in the present embodiment the volume of same frequency slices has "time" as its vertical axis: the variable M being a counter that roughly corresponds to distance down the seismic trace. This organization provides additional utility in that an approximate time duration of a thin bed event can be established.

For purposes of illustration, assume that a given thin bed event has a frequency domain notch as 10 hertz. Then, every short window Fourier transform that includes that bed will exhibit the same notch. If a 10 hertz volume of slices is examined, there will be a range of slices that contain the notch. Thus, by viewing successive slices in the constant frequency volume, it is possible to localize in time the reflector of interest. More importantly, if it is known that a particular notch occurs at, say, 10 hertz, the 10 hertz tuning cube can be animated and viewed as an aid in determining the lateral extent of the thin bed: the limits of the notch as observed in this frequency tuning cube defining the terminus of the bed.

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could be used to process and/or analyze multi-component seismic data, shear wave data, magneto-telluric data, cross well survey data, full waveform sonic logs, or model-based digital simulations of any of the foregoing. In short, the process disclosed herein can potentially be applied to any single geophysical time series, but it is preferably applied to a collection of spatially related time series containing thin bed events. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method for the exploration of hydrocarbons, comprising the steps of:
    (a) accessing a set of spatially related seismic traces, said spatially related seismic traces containing digital samples, said digital samples being characterized by at least a time, a position, and an amplitude;
    (b) selecting a part of said set of spatially related seismic traces to define a zone of interest;
    (c) transforming at least a portion of said seismic traces within said zone of interest using a Fourier transformation, said Fourier transformation
        (i) being characterized by a plurality of orthonormal basis functions, and
        (ii) being applied to a window containing said digital samples to produce a plurality of transform coefficients associated with said orthonormal basis functions;

(d) organizing said transform coefficients into a tuning cube;

(e) multiplying said transform coefficients by a scaling value to form a scaled tuning cube, said scaling value being determined by
  (i) selecting at least two transform coefficients corresponding to a same said basis function,
  (ii) calculating a complex magnitude of all transform coefficients so selected,
  (iii) calculating an average value from all transform coefficient magnitudes so calculated, and,
  (iv) calculating a scaling value from said average value; and, (f) displaying said scaled tuning cube.

2. A method for the exploration of hydrocarbons, comprising the steps of:
  (a) obtaining a representation of a set of spatially related seismic traces distributed over a pre-determined volume of the earth, said seismic traces containing digital samples, said digital samples being characterized by at least a time, a position, and an amplitude;
  (b) selecting a part of said volume and the spatially related seismic traces contained therein to define a zone of interest within said volume;
  (c) defining a window within said zone of interest, said window having a starting sample number and encompassing digital samples;
  (d) transforming at least a portion of said spatially related seismic traces within said zone of interest using a discrete orthonormal transformation, said discrete orthonormal transformation
    (i) being characterized by a plurality of orthonormal basis functions, and
    (ii) being applied to a window containing said digital samples to produce a plurality of transform coefficients associated with said orthonormal basis functions;
  (e) organizing said transform coefficients into a tuning cube, said tuning cube and the transform coefficients therein being associated with said starting sample number;
  (f) repeating steps (c) and (d) for a plurality of window definitions, thereby producing a plurality of tuning cubes; and,
  (g) displaying one or more of said plurality of tuning cubes.

3. A method according to claim 2, wherein step (g) comprises the steps of:
  (i) selecting an orthonormal basis function;
  (ii) selecting a tuning cube from said plurality of tuning cubes;
  (iii) extracting from said selected tuning cube a plurality of the transform coefficients associated with said selected orthonormal basis function;
  (iv) repeating steps (ii) and (iii) for at least one other selected tuning cube;
  (v) organizing said extracted transform coefficients into a single frequency tuning cube; and,
  (vi) displaying said single frequency tuning cube.

4. A method according to claim 3, wherein said organization in step (v) includes ordering said extracted transform coefficients by said starting sample number associated therewith.

5. A method according to claim 2, wherein said discrete orthonormal transform is a Fourier transform.

6. A method according to claim 2, wherein a weight function is applied within said window containing digital samples prior to transformation by said discrete orthonormal transform.

7. A method according to claim 6, wherein said weight function is a Gaussian weight function.

8. A method according to claim 2, wherein the step (g) includes the further step of recording visually perceptible images representative of one or more of said tuning cubes on a generally flat medium.

9. A method according to claim 8, further including the step of using said visually perceptible images to identify subsurface structural and sedimentological features commonly associated with the entrapment and storage of hydrocarbons.

10. In the exploration for hydrocarbons, a seismic attribute map prepared by a process, said process comprising the steps of:
  (a) accessing by means of a computer, a data set comprising seismic traces distributed over a pre-determined volume of the earth, said seismic traces containing digital samples, said digital samples being characterized by at least a time, a position, and an amplitude;
  (b) selecting a plurality of spatially related seismic traces from said seismic trace data set;
  (c) selecting a zone of interest within said selected plurality of spatially related seismic traces;
  (d) transforming at least a portion of said spatially related seismic traces within said zone of interest using a discrete orthonormal transformation, said discrete orthonormal transformation producing transform coefficients from said spatially related seismic traces so transformed; and,
  (e) organizing said transform coefficients into a tuning cube;
  (f) calculating a plurality of seismic attribute values from said transform coefficients organized into said tuning cube; and,
  (g) displaying said seismic attribute values at locations representative of said positions.

11. In the exploration for hydrocarbons, wherein seismic data comprising reflected seismic energy are recorded as a function of time over a pre-determined volume of the earth to produce a plurality of spatially related seismic traces, said spatially related seismic traces containing samples, said samples being characterized by at least a time, a position, and an amplitude, a map for the exploration of oil and gas produced by the process of claim 10, comprising:
  (a) a generally flat medium for recording visually perceptible images thereon; and,
  (b) at least one visually perceptible image on said generally flat medium, said visually perceptible image representative of said calculated seismic attribute values.

12. A method for the generation of seismic attributes for use in the exploration of hydrocarbons, comprising the steps of:
  (a) obtaining a representation of a set of seismic traces distributed over a pre-determined volume of the earth, said seismic traces containing samples, said samples being characterized by at least a time, a position, and an amplitude;
  (b) selecting a part of said volume and the seismic traces contained therein to define a zone of interest within said volume;
  (c) transforming at least a portion of said seismic traces within said zone of interest using a discrete orthonormal transformation, said very short time discrete orthonormal transformation producing transform coefficients;

(d) organizing said transform coefficients into a tuning cube; and, (e) calculating, from said tuning cube, a plurality of seismic attributes.

13. A computer based method of filtering geophysical time series, comprising the steps of:

(a) obtaining a representation of a set of spatially related seismic traces distributed over a pre-determined volume of the earth, said spatially related seismic traces containing digital samples, said digital samples being characterized by at least a time, a position, and an amplitude;

(b) selecting a part of said volume and the spatially related seismic traces contained therein to define a zone of interest within said volume;

(c) transforming at least a portion of said spatially related seismic traces within said zone of interest using a discrete orthonormal transformation, said discrete orthonormal transformation producing transform coefficients from said spatially related seismic traces so transformed; and, (d) organizing said transform coefficients into a tuning cube;

(e) scaling said transform coefficients within said tuning cube; and, (f) inverting said tuning cube using a discrete orthonormal transformation inverse, thereby producing a filtered version of said transformed portion of said spatially related seismic traces.

14. A method according to claim 13, wherein the step of scaling said transform coefficients within said tuning cube comprises the steps of:

(i) selecting at least two transform coefficients corresponding to a same basis function;

(ii) calculating a complex magnitude of all transform coefficients so selected;

(iii) calculating a statistical value from all transform coefficient magnitudes so calculated;

(iv) calculating a scaling value from said statistical value; and, (v) applying said scaling value to a plurality of transform coefficients corresponding to said same basis function.

15. A method according to claim 14, wherein said statistical value is an arithmetic average of all transform coefficient magnitudes so calculated.

16. In a digital computer wherein seismic traces obtained over a pre-determined volume of the earth are read into memory, wherein a plurality of spatially related seismic traces are selected from said seismic traces, and wherein a zone of interest within said spatially related seismic traces has been defined, a digital computer programmed to perform a process comprising the steps of:

(a) transforming at least a portion of said spatially related seismic traces within said zone of interest using a discrete orthonormal transformation, said discrete orthonormal transformation producing transform coefficients from said spatially related seismic traces so transformed;

(b) organizing said transform coefficients into a tuning cube;

(c) scaling said transform coefficients within said tuning cube; and, (d) inverting said tuning cube using a discrete orthonormal transformation inverse, thereby producing a filtered version of said transformed portion of said spatially related seismic traces.

17. A device adapted for use by a digital computer wherein a plurality of computer instructions defining the process of claim 16 are encoded, said device being readable by said digital computer, and said computer instructions programming said computer to perform said process.

18. The device of claim 17, wherein said device is selected from the group consisting of a magnetic tape, a magnetic disk, an optical disk and a CD-ROM.

* * * * *

UNITED STATES PATENT AND TRADEMARK OFFICE
CERTIFICATE OF CORRECTION

PATENT NO. : 5,870,691

DATED : Feb. 9, 1999

INVENTOR(S) : Gregory A. Partyka; James M. Gridley

It is certified that error appears in the above-identified patent and that said Letters Patent is hereby corrected as shown below:

| Col. | Line | |
|---|---|---|
| 13 | 30 | "data transformations that could used"<br><br>should read:<br><br>--data transformations that could be used-- |
| 17 | 23 | "an input trace xo,k,nt)"<br><br>should read:<br><br>--an input trace x(j,k,nt)-- |
| 20 | 2 | "extracted from Ao,k,i)"<br><br>should read:<br><br>--extracted from A(j,k,i)-- |

UNITED STATES PATENT AND TRADEMARK OFFICE
CERTIFICATE OF CORRECTION

PATENT NO. : 5,870,691
DATED : Feb. 9, 1999
INVENTOR(S) : Gregory A. Partyka; James M. Gridley It is certified that error appears in the above-identified patent and that said Letters Patent is hereby corrected as shown below:

| Col. | Line |
|------|------|
| 22 | 39-40 |

"calculated at every other star The Fourin within the zone of interest."

should read:

--calculated at every other starting position within the zone of interest.

Signed and Sealed this

Thirteenth Day of July, 1999

Attest:

Q. TODD DICKINSON

Attesting Officer

Acting Commissioner of Patents and Trademarks